(12) United States Patent
Yoshimaru

(10) Patent No.: US 8,018,842 B2
(45) Date of Patent: Sep. 13, 2011

(54) COUNTER MULTI-FAILURE SYSTEM AND COMMON LINK TERMINAL DEVICE USED THEREIN

(75) Inventor: Takehiro Yoshimaru, Tokyo (JP)

(73) Assignee: ALAXALA Networks Corporation, Kanagawa (JP)

( * ) Notice: Subject to any disclaimer, the term of this patent is extended or adjusted under 35 U.S.C. 154(b) by 432 days.

(21) Appl. No.: 12/028,214

(22) Filed: Feb. 8, 2008

(65) Prior Publication Data

US 2009/0022052 A1 Jan. 22, 2009

(30) Foreign Application Priority Data

Jul. 19, 2007 (JP) ................................. 2007-188223

(51) Int. Cl.
*H04J 1/16* (2006.01)
(52) U.S. Cl. ........................................ 370/223; 370/258
(58) Field of Classification Search .......... 370/217–220, 370/222–225, 242–245, 241.1, 249, 403–6, 370/258
See application file for complete search history.

(56) References Cited

U.S. PATENT DOCUMENTS 7,003,705 B1 * 2/2006 Yip et al. ....................... 714/717
7,606,240 B1 * 10/2009 Shah ............................. 370/400
2005/0207348 A1 * 9/2005 Tsurumi et al. ............... 370/241

FOREIGN PATENT DOCUMENTS

| JP | 2004-201009 | 7/2004 |
| WO | WO 2006/128808 | 12/2006 |

OTHER PUBLICATIONS

"Foundry BigIron RX Series Configuration Guide", Chapter 15, Metro Ring Protocol (MRP), http://www.foundrynet.com/services/documentation/bigiron_rx_config/Metro.html, Mar. 23, 2007.

* cited by examiner

*Primary Examiner* — Derrick W Ferris
*Assistant Examiner* — Peter Cheng
(74) *Attorney, Agent, or Firm* — Antonelli, Terry, Stout & Kraus, LLP.

(57) ABSTRACT

Arrangements dealing with multiple link failures occurring in a communication network including a first ring and a second ring connected to the first ring by sharing part of a link in the first ring as a common link. Included is stored link failure information included in the failure detection frame, and where a controller configured to control the communication unit to stop transmission of at least one auxiliary monitor frame in the event of multiple failures including a failure on the common link, but to allow transmission under certain specific circumstances.

3 Claims, 20 Drawing Sheets

Fig.4

| Link Failure Information | MAC Address | Monitoring Ring ID | Common Ring IDs |
|---|---|---|---|
| R1 | 00-00-00-00-00-02 (1102) | 10 | 10,20 |
| R2 | 00-00-00-00-00-02 (1102) | 20 | 10,20 |
| R3 | 00-00-00-00-00-05 (1105) | 10 | 10,20 |
| R4 | 00-00-00-00-00-05 (1105) | 20 | 10,20 |
| R5 | 00-00-00-00-00-08 (1108) | 10 | - |
| R6 | 00-00-00-00-00-09 (1109) | 10 | - |
| | | | |
| | | | |

Fig.11

| Link Failure Information | MAC Address | Monitoring Ring ID | Common Ring IDs |
|---|---|---|---|
| R11 | 00-00-00-00-00-13 (2103) | 10 | 10,20,30 |
| R12 | 00-00-00-00-00-13 (2103) | 20 | 10,20,30 |
| R13 | 00-00-00-00-00-13 (2103) | 30 | 10,20,30 |
| R14 | 00-00-00-00-00-16 (2106) | 10 | 10,20,30 |
| R15 | 00-00-00-00-00-16 (2106) | 20 | 10,20,30 |
| R16 | 00-00-00-00-00-16 (2106) | 30 | 10,20,30 |
| R17 | 00-00-00-00-00-17 (2107) | 10 | - |
| R18 | 00-00-00-00-00-1A (2110) | 10 | - |
|  |  |  |  |
|  |  |  |  |

Fig.14

| Link Failure Information | MAC Address | Monitoring Ring ID | Common Ring IDs |
|---|---|---|---|
| R21 | 00-00-00-00-00-22 (3102) | 10 | 10,20 |
| R22 | 00-00-00-00-00-22 (3102) | 20 | 10,20 |
| R23 | 00-00-00-00-00-25 (3105) | 10 | 10,20 |
| R24 | 00-00-00-00-00-25 (3105) | 20 | 10,20 |
| R25 | 00-00-00-00-00-2B (3142) | 10 | 10,30 |
| | | | |
| | | | |

Fig.15

| Link Failure Information | MAC Address | Monitoring Ring ID | Common Ring IDs |
|---|---|---|---|
| R21 | 00-00-00-00-00-22 (3102) | 10 | 10,20 |
| R22 | 00-00-00-00-00-22 (3102) | 20 | 10,20 |
| R23 | 00-00-00-00-00-25 (3105) | 10 | 10,20 |
| R24 | 00-00-00-00-00-25 (3105) | 20 | 10,20 |
| R26 | 00-00-00-00-00-28 (3108) | 10 | 10,30 |
| | | | |
| | | | |

Fig.16

| Link Failure Information | MAC Address | Monitoring Ring ID | Common Ring IDs |
|---|---|---|---|
| R31 | 00-00-00-00-00-28 (3108) | 10 | 10,30 |
| R32 | 00-00-00-00-00-28 (3108) | 30 | 10,30 |
| R33 | 00-00-00-00-00-2B (3142) | 10 | 10,30 |
| R34 | 00-00-00-00-00-2B (3142) | 30 | 10,30 |
| R35 | 00-00-00-00-00-25 (3105) | 10 | 10,20 |
|  |  |  |  |
|  |  |  |  |

Fig.17

| Link Failure Information | MAC Address | Monitoring Ring ID | Common Ring IDs |
|---|---|---|---|
| R31 | 00-00-00-00-00-28 (3108) | 10 | 10,30 |
| R32 | 00-00-00-00-00-28 (3108) | 30 | 10,30 |
| R33 | 00-00-00-00-00-2B (3142) | 10 | 10,30 |
| R34 | 00-00-00-00-00-2B (3142) | 30 | 10,30 |
| R36 | 00-00-00-00-00-22 (3102) | 10 | 10,20 |
|  |  |  |  |
|  |  |  |  |

Fig.18

| Link Failure Information | MAC Address | Monitoring Ring ID | Common Ring IDs |
|---|---|---|---|
| R41 | 00-00-00-00-00-22 (3102) | 10 | 10,20 |
| R42 | 00-00-00-00-00-2B (3142) | 10 | 10,30 |
| | | | |
| | | | |

Fig.21

| Link Failure Information | MAC Address | Monitoring Ring ID | Common Ring IDs |
|---|---|---|---|
| R51 | 00-00-00-00-00-34 (4104) | 10 | 10,20 |
| R52 | 00-00-00-00-00-34 (4104) | 20 | 10,20 |
| R53 | 00-00-00-00-00-35 (4105) | 10 | 10,20 |
| R54 | 00-00-00-00-00-35 (4105) | 20 | 10,20 |
| R55 | 00-00-00-00-00-38 (4108) | 20 | 20,30 |
|  |  |  |  |
|  |  |  |  |

Fig.22

| Link Failure Information | MAC Address | Monitoring Ring ID | Common Ring IDs |
|---|---|---|---|
| R51 | 00-00-00-00-00-34 (4104) | 10 | 10,20 |
| R52 | 00-00-00-00-00-34 (4104) | 20 | 10,20 |
| R53 | 00-00-00-00-00-35 (4105) | 10 | 10,20 |
| R54 | 00-00-00-00-00-35 (4105) | 20 | 10,20 |
| R56 | 00-00-00-00-00-35 (4105) | 20 | 20,30 |
| R57 | 00-00-00-00-00-35 (4105) | 30 | 20,30 |
| R58 | 00-00-00-00-00-38 (4108) | 30 | 20,30 |
|  |  |  |  |
|  |  |  |  |

Fig.23

| Link Failure Information | MAC Address | Monitoring Ring ID | Common Ring IDs |
|---|---|---|---|
| R51 | 00-00-00-00-00-34 (4104) | 10 | 10,20 |
| R53 | 00-00-00-00-00-35 (4105) | 10 | 10,20 |
| R57 | 00-00-00-00-00-35 (4105) | 30 | 20,30 |
| R58 | 00-00-00-00-00-38 (3208) | 30 | 20,30 |
| R59 | 00-00-00-00-00-36 (4106) | 30 | 20,30 |
|  |  |  |  |
|  |  |  |  |

Fig.24

| Link Failure Information | MAC Address | Monitoring Ring ID | Common Ring IDs |
|---|---|---|---|
| R52 | 00-00-00-00-00-34 (4104) | 20 | 10,20 |
| R54 | 00-00-00-00-00-35 (4105) | 20 | 10,20 |
| R56 | 00-00-00-00-00-35 (4105) | 20 | 20,30 |
| R57 | 00-00-00-00-00-35 (4105) | 30 | 20,30 |
| R58 | 00-00-00-00-00-38 (4108) | 30 | 20,30 |
| R60 | 00-00-00-00-00-38 (4108) | 20 | 20,30 |
|  |  |  |  |
|  |  |  |  |

US 8,018,842 B2

COUNTER MULTI-FAILURE SYSTEM AND COMMON LINK TERMINAL DEVICE USED THEREIN

BACKGROUND OF THE INVENTION

1. Field of the Invention

The present invention relates to a technique of dealing with multiple link failures occurring in a communication network.

2. Description of the Related Art

A transmission control procedure called a ring protocol is generally adopted in topology of a ring structure (hereafter referred to as ring topology) in an Ethernet (registered trademark) communication network. The ring protocol is a layer 2 network redundant protocol. Multiple devices relaying user frames in a ring (hereafter these devices are referred to as relay devices) are interlinked in the ring structure. At least one of the relay devices is assigned to a device sending a frame (monitor frame) for checking the state of the ring (hereafter this device is referred to as monitor device). This arrangement of the ring protocol continuously monitors the state of the ring and controls ports of the respective devices to detect the occurrence of any failure and immediately change the communication route in response to the detection. The ring protocol enables the prompt change of the communication route in the event of the occurrence of a failure. Another advantage of the ring topology reduces the total number of transmission paths and interfaces, compared with mesh topology of connecting the respective relay devices in a net structure.

Since one single ring can not deal with plural failures occurring in the network, the ring protocol generally adopts a structure of using multiple rings interlinked via a linkage (hereafter referred to as common link) to ensure the redundancy (hereafter referred to as multi-ring structure with a common link).

In the multi-ring structure with a common link, however, in the event of a failure occurring on the common link, the interlinked rings may cause a large loop (super-loop). Various systems have been proposed to solve this problem in the ring protocol.

One proposed system controls a device located at a terminal end of a common link (hereafter this device is referred to as common link terminal device) shared by two interlinked rings to send an auxiliary monitor frame to a monitor device of one ring (see Japanese Patent Laid-Open No. 2004-201009). This assigns the ring to a non-working ring of monitoring the occurrence of a failure on the common link. Even in the event of some failure on the common link, the monitor device receiving the auxiliary monitor frame (hereafter this device is referred to as auxiliary monitor device) keeps one of ports blocked to allow transmission of monitor frames but prohibit transmission of user frames, with a view to avoid the occurrence of the super-loop.

Another proposed system sets a preferential order to multiple rings and, in the event of a failure occurring on a common link shared by the multiple rings, causes a monitor frame in a ring of the higher priority to be introduced to a ring of the lower priority. Circling the monitor frame in these rings controls the blocking (see 'Foundry BigIron RX Series Configuration Guide', Chapter 15, Metro Ring Protocol (MRP)).

The multi-ring structure with the common link can deal with plural failures with some restriction in the ring topology. In the prior art system of the former cited reference, however, in a multi-failure state with one failure on the common link and another failure on another link in the ring assigned to the working ring of monitoring the common link, the auxiliary monitor frame sent from the common link terminal device reaches the monitor device in the ring assigned to the non-working ring of monitoring the common link. The reception of the auxiliary monitor frame interferes with release of the blocked port in the monitor device. This leads to failed recovery of communication even in the presence of the physical connection.

In the prior art system of the latter cited reference, on the other hand, in a multi-failure state with one failure on the common link and another failure on another link in the ring assigned to the working ring of monitoring the common link, the monitor frame does not reach the monitor device in the ring assigned to the non-working ring of monitoring the common link. This allows release of the blocked port in the monitor device and is free from the above problem arising in the system of the former cited reference. The system of the latter cited reference, however, still has some disadvantages. The occurrence of each failure on the common link increases the number of relay devices as passing points of a monitor frame. This causes the delay of the monitor frame and increases the potential for wasting the frame due to the convergence.

SUMMARY OF THE INVENTION

In a network of a multi-ring structure, even in a multi-failure state with a failure on a common link and another failure on a link other than the common link, there would be a demand for detecting the occurrence of multiple failures and enable continuous communication without increasing the number of relay devices as passing points of a monitor frame.

The present invention accomplishes at least part of the above and other related demands by the following configurations applied to a counter multi-failure system and a common link terminal device used in the system.

One aspect of the invention pertains to a counter multi-failure system of dealing with multiple link failures occurring in a communication network including a first ring and a second ring connected to the first ring by sharing part of a link in the first ring as a common link. The counter multi-failure system includes: a common link terminal device located at a terminal end of the common link and configured to send an auxiliary monitor frame to the second ring; and a monitor device located on the second ring and configured to receive a monitor frame sent by the monitor device and circled through the second ring, as well as the auxiliary monitor frame and block at least one specific port among ports connecting with the second ring. The common link terminal device has: a communication unit configured to send the auxiliary monitor frame and receive a failure detection frame sent from a device located on a ring in the occurrence of a link failure in the ring; a storage unit configured to store link failure information included in the failure detection frame; and a controller configured to identify occurrence or non-occurrence of multiple failures including a failure on the common link based on the stored link failure information and, upon identification of the occurrence of multiple failures, to control the communication unit to stop transmission of the auxiliary monitor frame. The monitor device cancels the blocking of the specific port in the case of non-reception of the monitor frame for a preset time period and non-reception of the auxiliary monitor frame.

In the counter multi-failure system according to one aspect of the invention, upon detection of the occurrence of multiple failures including a failure of the common link, the common link terminal device is controlled to stop transmission of the auxiliary monitor frame. The monitor device receives neither the monitor frame for the preset time period nor the auxiliary monitor frame and thereby cancels the blocking of the specific port. Cancellation of the blocking of the specific port in this manner enables continuous communication without increasing the number of relay devices as the passing points of the monitor frame. This arrangement allows continuous communication even in the occurrence of multiple failures in the communication network of the multi-ring structure.

In one preferable application of the counter multi-failure system according to the above aspect of the invention, in response to cancellation of a recovery deterrent state after recovery of the link from the multiple failures, the monitor device blocks the specific port and sends a specific control frame to the second ring.

In the counter multi-failure system of this application, in the case of recovery of the link from the multiple failures, the monitor device cancels the recovery deterrent state to block the specific port again. Transmission of the specific control frame informs another device of the recovery of the link from the multiple failures.

In one preferable embodiment of the counter multi-failure system of this application, when the communication unit of the common link terminal device receives the specific control frame, the controller of the common link terminal device deletes at least part of the link failure information stored in the storage unit and controls the communication unit to start transmission of the auxiliary monitor frame.

In the counter multi-failure system of this embodiment, the common link terminal device receives the specific control frame and recognizes recovery of the link from the multiple failures. The common link terminal device deletes non-required information, such as link failure information correlated to the recovered link, from the storage unit and starts transmission of the auxiliary monitor frame. This recovers the normal state before the occurrence of the multiple failures.

In another preferable application of the counter multi-failure system according to the above aspect of the invention, upon dissatisfaction of a predetermined condition based on the link failure information, the controller of the common link terminal device controls the communication unit to continue transmission of the auxiliary monitor frame even in the event of detection of the multiple failures.

In the counter multi-failure system of this application, even in the event of detection of multiple failures, the multi-ring structure may allow continuous communication without cancelling the blocking of the specific port in the monitor device located on the second ring. In such cases, there is no need of stopping transmission of the auxiliary monitor frame.

In a communication network including a first ring and a second ring connected to the first ring by sharing part of a link in the first ring as a common link, another aspect of the invention pertains to a common link terminal device located at a terminal end of the common link. The common link terminal device includes: a communication unit configured to send an auxiliary monitor frame to a monitor device located on the second ring and receive a failure detection frame sent from a device located on a ring in the occurrence of a link failure in the ring; a storage unit configured to store link failure information included in the failure detection frame; and a controller configured to identify occurrence or non-occurrence of multiple failures including a failure on the common link based on the stored link failure information and, upon identification of the occurrence of multiple failures, to control the communication unit to stop transmission of the auxiliary monitor frame.

Upon detection of the occurrence of multiple failures including a failure of the common link, the common link terminal device according to this aspect of the invention stops transmission of the auxiliary monitor frame to the monitor device. The monitor device does not receive the auxiliary monitor frame and may cancel the blocking of the specific port under a predetermined condition. Cancellation of the blocking of the specific port in this manner enables continuous communication without increasing the number of relay devices as the passing points of the monitor frame. This arrangement allows continuous communication even in the occurrence of multiple failures in the communication network of the multi-ring structure.

In one preferable application of the common link terminal device according to this aspect of the invention, when the communication unit receives the specific control frame from the monitor device, the controller deletes at least part of the link failure information stored in the storage unit and controls the communication unit to start transmission of the auxiliary monitor frame.

The common link terminal device of this application receives the specific control frame from the monitor device and recognizes recovery of the link from the multiple failures. The common link terminal device deletes non-required information, such as link failure information correlated to the recovered link, from the storage unit and starts transmission of the auxiliary monitor frame. This enables the common link terminal device to be recovered to the state before the occurrence of the multiple failures.

In another preferable application of the common link terminal device according to the above aspect of the invention, upon dissatisfaction of a predetermined condition based on the link failure information, the controller controls the communication unit to continue transmission of the auxiliary monitor frame even in the event of detection of the multiple failures.

Even in the event of detection of multiple failures, the multi-ring structure may allow continuous communication without cancelling the blocking of the specific port in the monitor device located on the second ring. In such cases, there is no need of stopping transmission of the auxiliary monitor frame.

The present invention is not restricted to the counter multi-failure system or the common link terminal device described above, but the technique of the invention may be actualized by a diversity of other applications, for example, a method of dealing with multiple failures, computer programs to attain any of the counter multi-failure system, the common link terminal device, and the method of dealing with multiple failures, and recording media in which such computer programs are recorded.

BRIEF DESCRIPTION OF THE DRAWINGS

FIG. 4 shows the contents of a link failure information management database stored in the common link terminal devices 1102 and 1108 in the state of FIG. 3;

FIG. 11 shows the contents of a link failure information management database stored in common link terminal devices 2103 and 2110 in the state of FIG. 10;

FIG. 14 shows the contents of a link failure information management database stored in a common link terminal device 3102 in the state of FIG. 13;

FIG. 15 shows the contents of a link failure information management database stored in a common link terminal device 3105 in the state of FIG. 13;

FIG. 16 shows the contents of a link failure information management database stored in a common link terminal device 3108 in the state of FIG. 13;

FIG. 17 shows the contents of a link failure information management database stored in a common link terminal device 3142 in the state of FIG. 13;

FIG. 18 shows the contents of a link failure information management database stored in common link terminal devices 3109 and 3143 in the state of FIG. 13;

FIG. 21 shows the contents of a link failure information management database stored in a common link terminal device 4104 in the state of FIG. 20;

FIG. 22 shows the contents of a link failure information management database stored in a common link terminal device 4105 in the state of FIG. 20;

FIG. 23 shows the contents of a link failure information management database stored in a common link terminal device 4106 in the state of FIG. 20; and FIG. 24 shows the contents of a link failure information management database stored in a common link terminal device 4108 in the state of FIG. 20.

DESCRIPTION OF THE PREFERRED EMBODIMENTS

Some modes of carrying out the invention are described below in the following sequence with reference to the accompanied drawings:

A. First Embodiment
B. Second Embodiment
C. Third Embodiment
D. Fourth Embodiment
E. General Flow of Embodiments

A. First Embodiment

Figure 1:
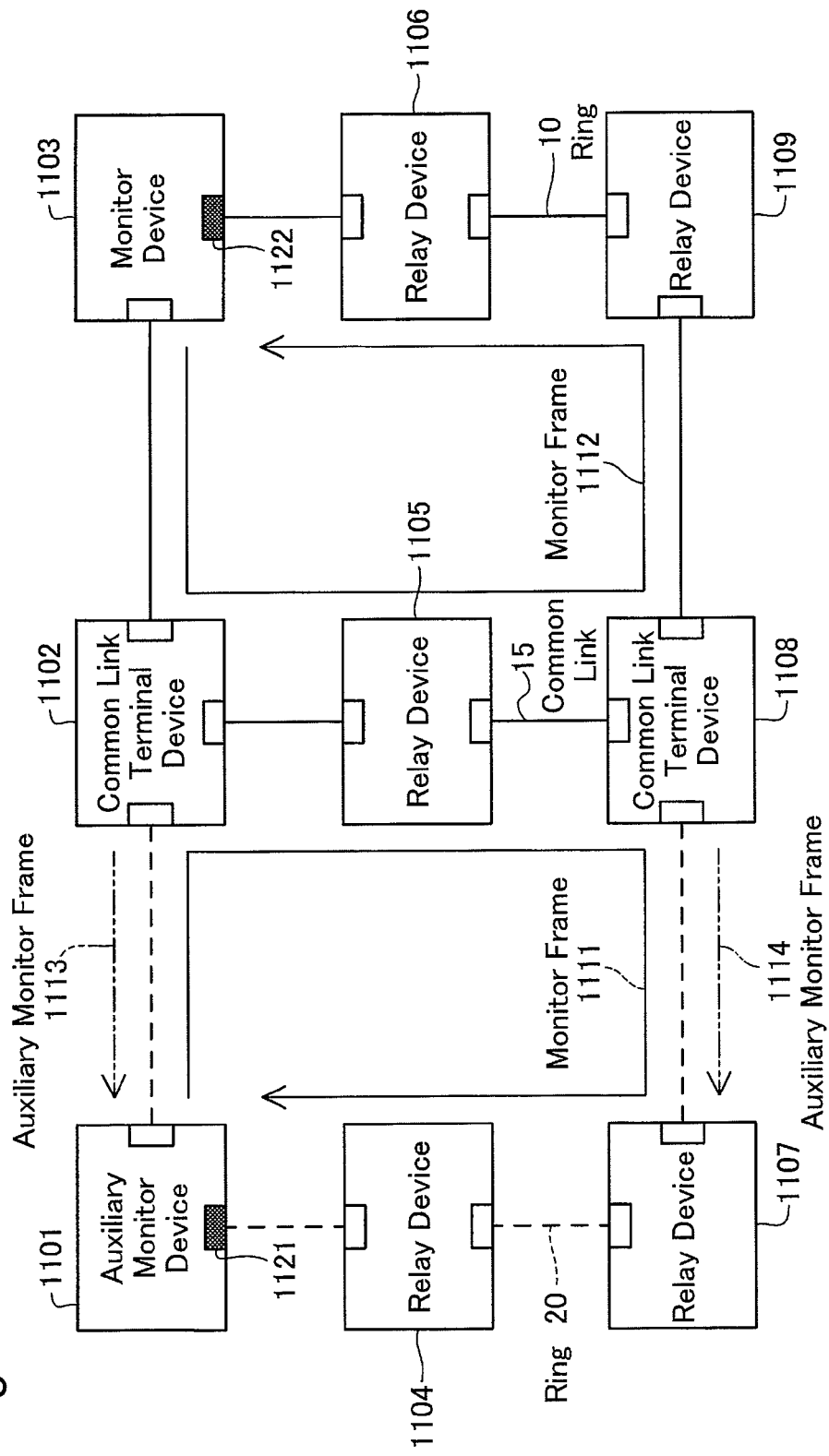
FIG. 1 is a block diagram showing an Ethernet communication network in a multi-ring structure according to a first embodiment of the invention.

FIG. 1 is a block diagram showing an Ethernet communication network in a multi-ring structure according to a first embodiment of the invention. In the Ethernet communication network, a ring 10 includes a monitor device 1103, relay devices 1106 and 1109, a relay device 1105, and common link terminal devices 1102 and 1108. A ring 20 includes an auxiliary monitor device 1101, relay devices 1104 and 1107, the relay device 1105, and the common link terminal devices 1102 and 1108. IDs '10' and '20' are allocated respectively to the ring 10 and to the ring 20.

A link connecting the common link terminal device 1102 with the relay device 1105 and the common link terminal device 1108 is a common link 15 shared by the ring 10 and the ring 20.

The common link terminal devices 1102 and 1108 respectively send auxiliary monitor frames 1113 and 1114 to the auxiliary monitor device 1101 in the ring 20. This assigns the ring 20 to a non-working ring of monitoring the occurrence of a failure on the common link 15. The auxiliary monitor frames 1113 and 1114 sent from the common link terminal devices 1102 and 1108 include the ID '20' representing the ring 20 as ID information.

The monitor device 1103 sends a monitor frame 1112 from one port connected to the ring 10 and receives the monitor frame 1112 returned after circling the ring 10, with a view to confirming the normal state of the ring 10. The monitor device 1103 keeps a specific port 1122 blocked, as long as normal reception of the monitor frame 1112 continues. In response to non-reception of the monitor frame 1112 for a preset time period, the monitor device 1103 recognizes the occurrence of a failure on the ring 10, cancels the blocking of the specific port 1122, and sends an FDB (forwarding database) flush frame as a control frame for deleting an FDB stored in each of the other devices as described later in detail.

The auxiliary monitor device 1101 sends a monitor frame 1111 from one port connected to the ring 20 and receives the monitor frame 1111 returned after circling the ring 20, as well as the auxiliary monitor frames 1113 and 1114 sent by the common link terminal devices 1102 and 1108, with a view to confirming the normal state of the ring 20. The auxiliary monitor device 1101 keeps a specific port 1121 blocked, as long as normal reception of the monitor frame 1111 and reception of the auxiliary monitor frames 1113 and 1114 continue. In response to non-reception of the monitor frame 1111 for a preset time period and non-reception of the auxiliary monitor frames 1113 and 1114, the auxiliary monitor device 1101 recognizes the occurrence of a failure on the ring 20, cancels the blocking of the specific port 1121, and sends the FDB flush frame. The blocking of the specific port 1121 is not canceled but is kept as long as reception of the auxiliary monitor frames 1113 and 1114 continues even in the case of non-reception of the monitor frame 1111 or as long as reception of the monitor frame 1111 continues even in the case of non-reception of the auxiliary monitor frames 1113 and 1114.

The monitor frame may be sent from only one port connected to the ring as in this embodiment or may be sent individually from both ports connected to the ring.

The relay devices 1104, 1105, 1106, 1107, and 1109 simply work to transfer the frames and have no other operations in the state of no failure.

Each device as a constituent of a communication network monitors, via its port, the state of a ring connecting with the port. In response to detection of the occurrence of any failure on a link connected to the port, the device sends a failure detection frame to the ring connecting with the port, that is, the ring as the object of monitoring via the port. When the link with detection of the occurrence of a failure is other than a common link, there is only one ring connecting with the port. The failure detection frame is thus sent to only this ring. When the link with detection of the occurrence of a failure is a common link shared by multiple rings, on the other hand, the failure detection frame is sent to all the rings connecting with a common port, that is, all the multiple rings sharing the common link.

If a device detecting the occurrence of a link failure and sending a failure detection frame receives the failure detection frame sent by itself, the received failure detection frame is to be discarded to avoid the loop. The failure detection frame is sent to and received from even the blocked specific port in the monitor device.

Each failure detection frame includes an MAC address allocated to the device sending the failure detection frame, an ID allocated to the ring connecting with the port detecting the occurrence of a link failure (that is, the ring as the object of monitoring via the port) (hereafter referred to as monitoring ring ID), and when a common port detects the occurrence of a link failure (that is, when a common link has a failure), IDs allocated to the rings sharing the common link (hereafter referred to as common ring IDs).

Figure 2:
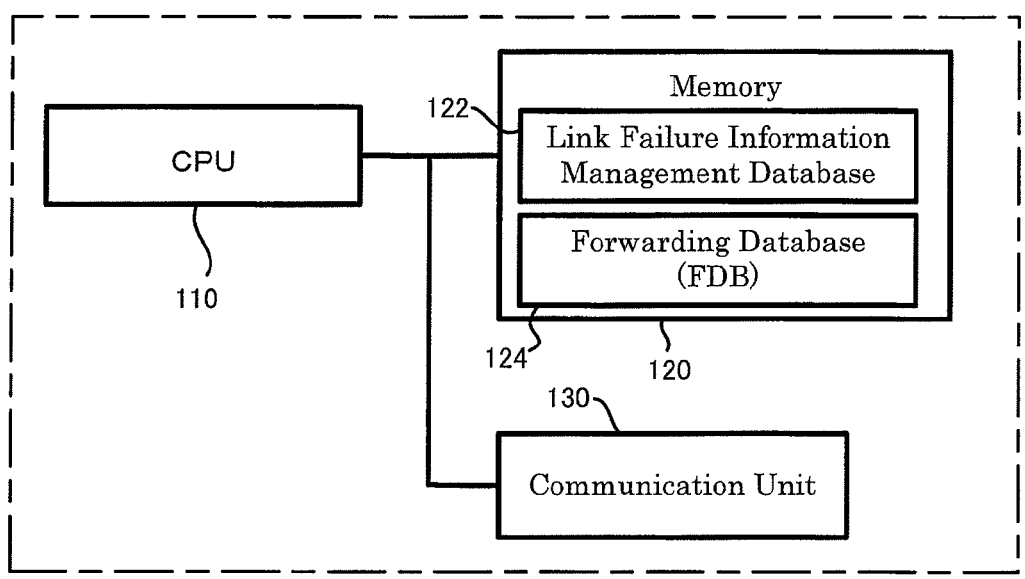
FIG. 2 is a block diagram schematically showing the structure of common link terminal devices 1102 and 1108 shown in FIG. 1.

FIG. 2 is a block diagram schematically showing the structure of the common link terminal devices 1102 and 1108 shown in FIG. 1. As shown in FIG. 2, each of the common link terminal devices 1102 and 1108 mainly includes a CPU 110 controlling the operations of the respective constituents, a memory 120 storing required pieces of information, and a communication unit 130 making communication with external devices. The memory 120 stores a link failure information management database 122 (described later) and a forwarding database (FDB) 124 as an information table used for controlling the forwarding destinations of each frame. An FDB is similarly incorporated in each of the other devices, as well as the common link terminal devices 1102 and 1108. The CPU 110 and the memory 120 in the structure of FIG. 2 respectively correspond to the controller and the storage unit in the claims of the invention.

Figure 3:
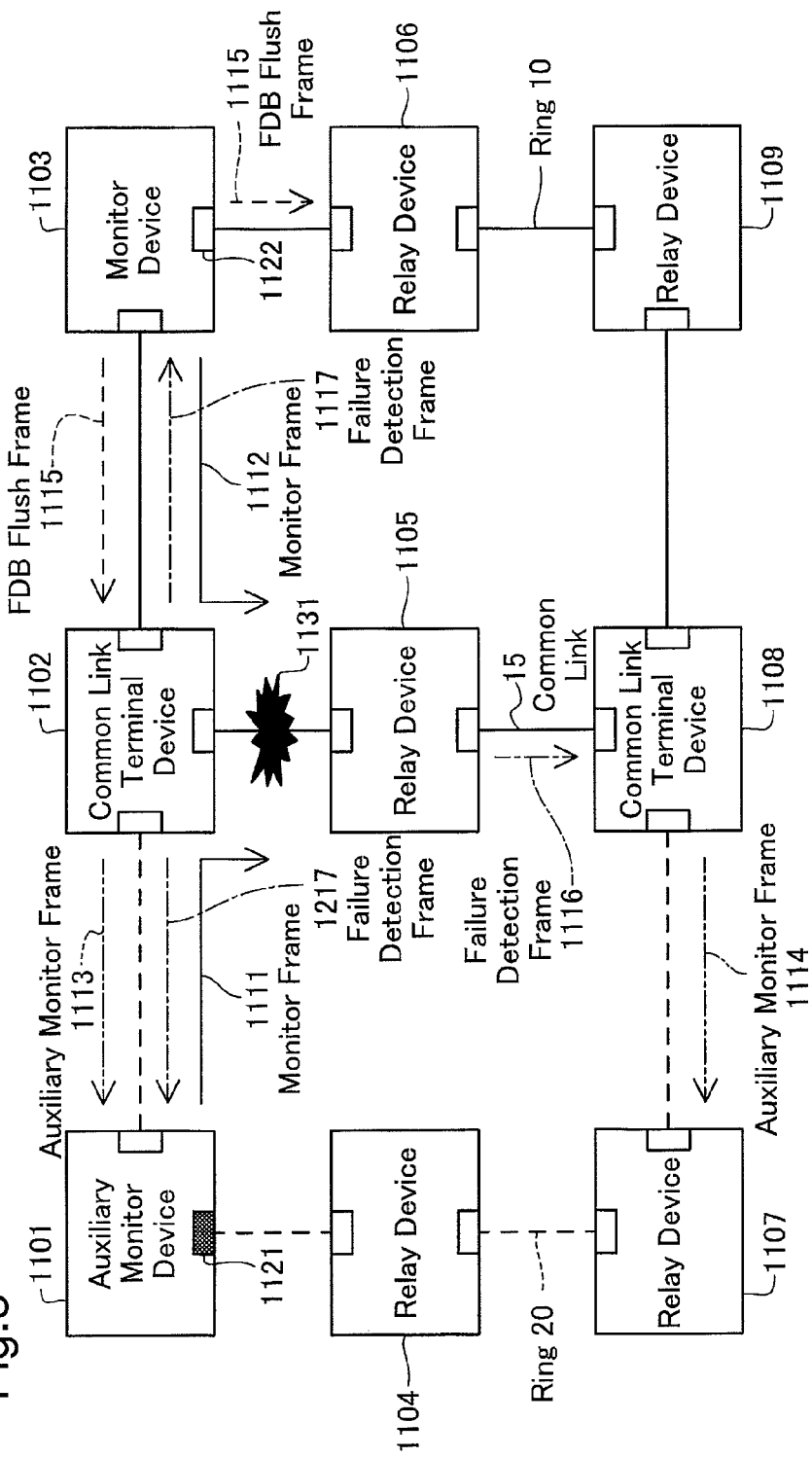
FIG. 3 is a block diagram showing the occurrence of a failure on a common link in the Ethernet communication network of FIG. 1.

FIG. 3 is a block diagram showing the occurrence of a failure on the common link 15 in the Ethernet communication network of FIG. 1. In the state of FIG. 3, a failure 1131 occurs on the common link 15 between the common link terminal device 1102 and the relay device 1105. In this case, the relay device 1105 detects the failure 1131 at its common port and sends a failure detection frame 1116 to all the rings 10 and 20 sharing the common link 15. The common link terminal device 1102 similarly detects the failure 1131 at its common port and sends a failure detection frame 1117 to all the rings 10 and 20 sharing the common link 15.

The failure detection frames 1116 and 1117 are sent through the specific port 1121 blocked in the auxiliary monitor device 1101 and the specific port 1122 blocked in the monitor device 1103 and eventually reach the common link terminal devices 1102 and 1108.

Figure 5:
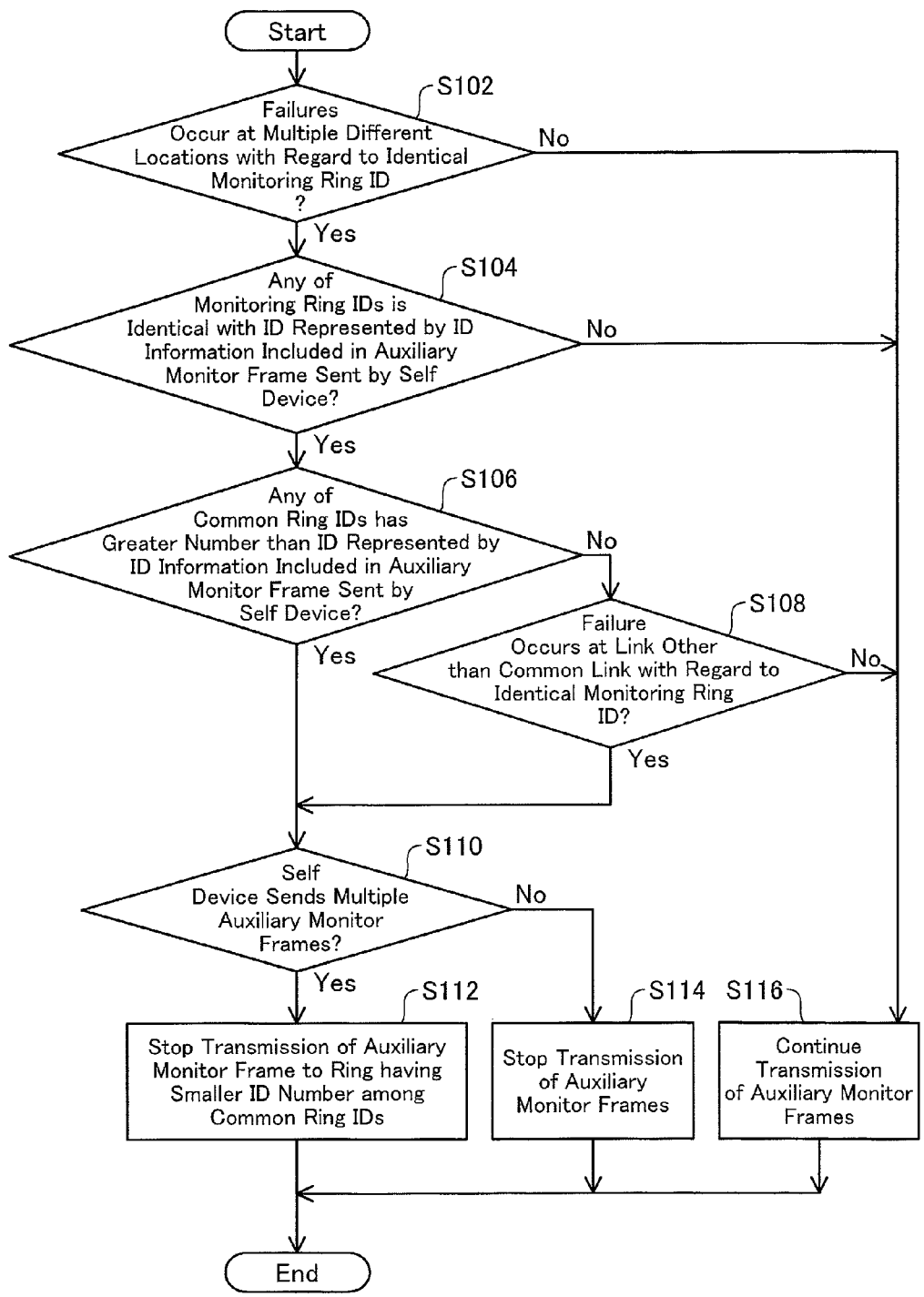
FIG. 5 is a flowchart showing a multi-failure detection routine executed by the common link terminal device shown in FIG. 1.

In response to reception of the failure detection frame or detection of the occurrence of a link failure via its own port, each of the common link terminal devices 1102 and 1108 adds link failure information as shown in FIG. 4 into the link failure information management database 122 sown in FIG. 2 and performs multi-failure detection based on the link failure information according to a flowchart of FIG. 5.

FIG. 4 shows the contents of the link failure information management database 122 stored in the common link terminal devices 1102 and 1108 in the state of FIG. 3. Each piece of link failure information includes the MAC address, the monitoring ring ID, and the common ring IDs. The numeral in each pair of parentheses denotes a device having the corresponding MAC address in FIG. 4 and subsequent similar drawings.

FIG. 5 is a flowchart showing a multi-failure detection routine executed by the common link terminal device 1102 or 1108 shown in FIG. 1.

In the event of the occurrence of the failure 1131 on the common link 15, each of the common link terminal devices 1102 and 1108 receives a failure detection frame at its communication unit 130 (see FIG. 2) or detects the occurrence of a link failure via its own port. In response to the reception of the failure detection frame or the detection of the link failure, the CPU 110 registers pieces of link failure information R1 to R4 in the link failure information management database 122 set in the memory 120 as shown in FIG. 4 and executes the multi-failure detection routine of FIG. 5 according to the registered pieces of link failure information R1 to R4.

According to the pieces of link failure information R1 and R3 including the monitoring ring ID '10' and the common ring IDs '10' and '20', the CPU 110 specifies the ring 10 as the ring with the occurrence of a failure and identifies the location of the failure as the common link 15 shared by the rings 10 and 20. According to the pieces of link failure information R2 and R4 including the monitoring ring ID '20' and the common ring IDs '10' and '20', the CPU 110 specifies the ring 20 as the ring with the occurrence of a failure and identifies the location of the failure as the common link 15 shared by the rings 10 and 20. The CPU 110 determines whether failures occur at multiple different positions with regard to an identical monitoring ring ID (step S102). In the state of FIG. 3, the two different pieces of link failure information R1 and R3 give the identical common ring IDs '10' and '20' in correlation to the identical monitoring ring ID '10'. The two different pieces of link failure information R2 and R4 also give the identical common ring IDs '10' and '20' in correlation to the identical monitoring ring ID '20'. The CPU 110 accordingly determines no occurrence of failures at multiple different positions with regard to any identical monitoring ring ID and proceeds to step S116 to control the communication unit 130 to continue transmission of the auxiliary monitor frame 1113 and 1114.

In response to non-reception of the monitor frame 1112 sent by itself for a preset time period, the monitor device 1103 in the ring 10 recognizes the occurrence of a failure on the ring 10, cancels the blocking of the specific port 1122, and sends an FDB flush frame 1115. For a high-speed route change responding to the occurrence of a failure, in response to reception of a failure detection frame, the monitor device 1103 may immediately cancel the blocking of the specific port 1122 and send the FDB flush frame 1115.

The auxiliary monitor device 1101 receives the auxiliary monitor frames 1113 and 1114 from the common link terminal devices 1102 and 1108 with failure in reception of the monitor frame 1111 sent by itself and accordingly keeps the specific port 1121 blocked.

In response to reception of the FDB flush frame 1115 from the monitor device 1103, the common link terminal devices 1102 and 1108 and the relay devices 1105, 1106, and 1109 delete the FDBs stored therein and urge the communication network to change the communication route. Deletion of the FDB may be carried out simultaneously over the whole device or at each port.

Figure 6:
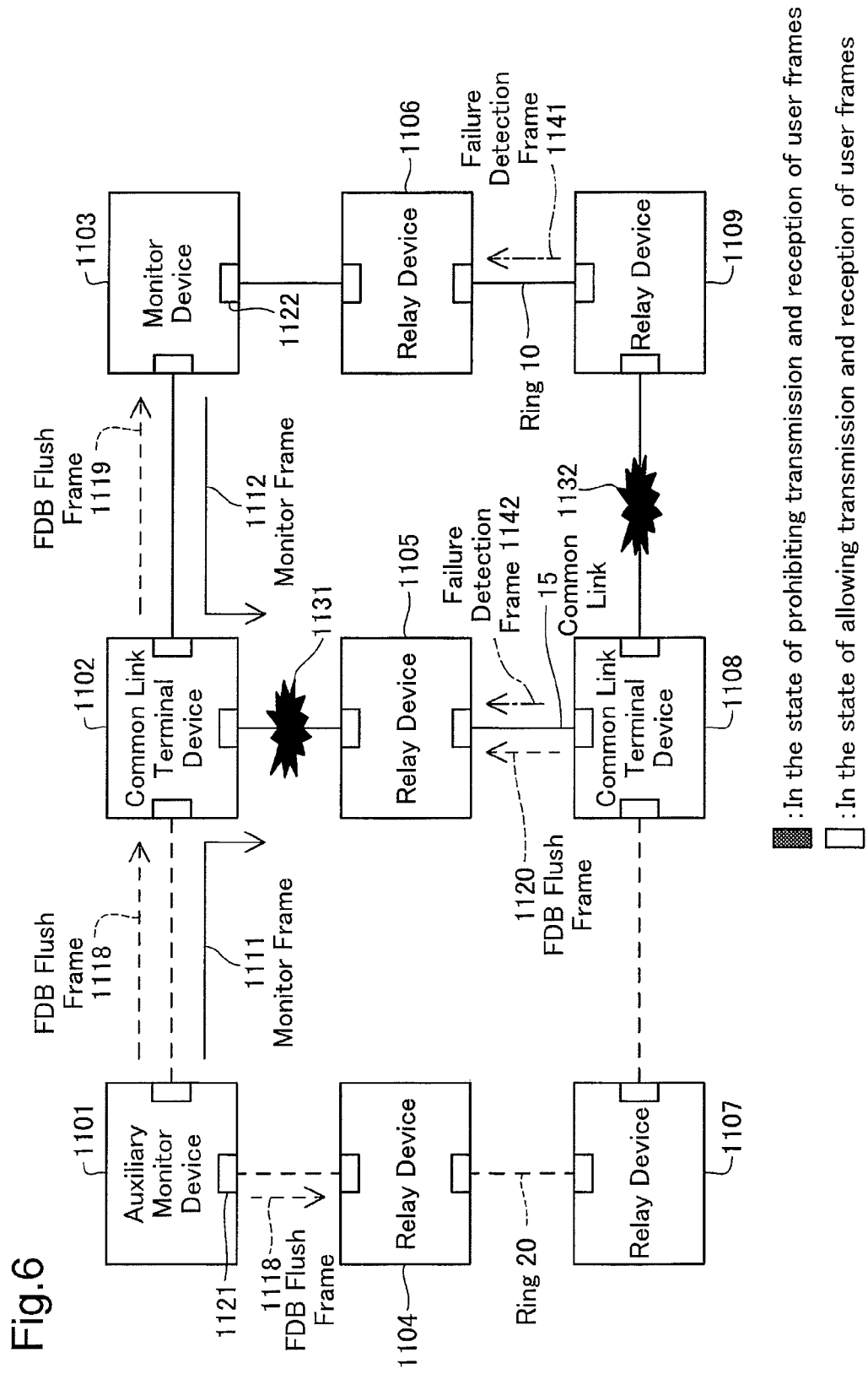
FIG. 6 is a block diagram showing the occurrence of multiple failures in the Ethernet communication network of FIG. 1.

FIG. 6 is a block diagram showing the occurrence of multiple failures in the Ethernet communication network of FIG. 1. In the state of FIG. 6, a failure 1132 occurs on a link between the relay device 1109 and the common link terminal device 1108, in addition to the failure 1131 occurring on the common link 15. In this case, the relay device 1109 sends a failure detection frame 1141 to only the ring 10 connected to the port detecting the occurrence of the failure 1132. The common link terminal device 1108 also sends a failure detection frame 1142 to only the ring 10 connected to the port detecting the occurrence of the failure 1132.

In each of the common link terminal devices 1102 and 1108, in response to reception of a failure detection frame at the communication unit 130 or detection of the occurrence of a link failure via its own port, the CPU 110 registers pieces of link failure information R5 and R6 in the link failure information management database 122 set in the memory 120 as shown in FIG. 4 and executes the multi-failure detection routine of FIG. 5 according to the registered pieces of link failure information.

According to the pieces of link failure information R5 and R6 including the monitoring ring ID '10' and no common ring IDs, the CPU 110 specifies the ring 10 as the ring with the occurrence of a failure and identifies the location of the failure as a link other than the common link 15.

The CPU 110 determines whether failures occur at multiple different positions with regard to an identical monitoring ring ID (step S102). In the state of FIG. 6, with regard to the identical monitoring ring ID '10', the pieces of link failure information R1 and R3 include the common ring IDs '10' and '20' suggesting the occurrence of a failure on the common link 15 shared by the rings 10 and 20, while the pieces of link failure information R5 and R6 include no common ring IDs suggesting the occurrence of a failure on a link other than the common link 15. Based on detection of the two different locations with regard to the identical monitoring ring ID '10', it is determined that the ring 10 has failures at two different positions. The CPU 110 accordingly determines the occurrence of failures at multiple different locations with regard to an identical monitoring ring ID and proceeds to step S104.

The CPU 110 determines whether any of the monitoring ring IDs is identical with an ID represented by ID information included in an auxiliary monitor frame sent by the self device (step S104). In the state of FIG. 6, the auxiliary monitor frames sent by the common link terminal devices 1102 and 1108 include the ID '20' representing the ring 20 as the ID information, while the pieces of link failure information R2 and R4 include the monitoring ring ID '20'. The CPU 110 accordingly determines that any of the monitoring ring IDs is identical with the ID represented by the ID information included in the auxiliary monitor frame and proceeds to step S106.

The CPU 110 determines whether any of the common ring IDs has a greater number than the ID represented by the ID information included in the auxiliary monitor frame sent by the self device (step S106). In the state of FIG. 6, the pieces of link failure information R1 to R4 include the common ring IDs '10' and '20', and there is no ID having a greater number than the ID '20' represented by the ID information included in the auxiliary monitor frame. The CPU 110 accordingly determines that there is no ring in failure having an ID greater in number than '20' and proceeds to step S108.

The CPU 110 determines whether a failure occurs on a link other than the common link with regard to an identical monitoring ring ID (step S108). In the state of FIG. 6, the pieces of link failure information R5 and R6 include no common ring IDs. The CPU 110 accordingly detects the occurrence of a failure on a link other than the common link and proceeds to step S110.

The CPU 110 determines whether the self device sends multiple auxiliary monitor frames (step S110). In the state of FIG. 6, the common link terminal devices 1102 and 1108 send the auxiliary monitor frame 1113 or 1114 to only one ring 20. The CPU 110 accordingly identifies no transmission of multiple auxiliary monitor frames and proceeds to step S114.

The CPU 110 controls the communication unit 130 to stop the transmission of the auxiliary monitor frame 1113 or 1114 (step S114). The common link terminal devices 1102 and 1108 accordingly stop the transmission of the auxiliary monitor frames 1113 and 1114.

In response to non-reception of the auxiliary monitor frames from the common link terminal devices 1102 and 1108, the auxiliary monitor device 1101 in the ring 20 recognizes the occurrence of a failure on the ring 20, cancels the blocking of the specific port 1121, and sends an FDB flush frame 1118. The common link terminal devices 1102 and 1108 receive the FDB flush frame 1118 from the auxiliary monitor device 1101 and respectively send FDB flush frames 1119 and 1120 to the ring 10 with multiple failures.

In response to reception of the FDB flush frame, the common link terminal devices 1102 and 1108, the relay devices 1104, 1105, 1106, 1107, and 1109, and the monitor 1103 delete the FDBs stored therein and urge the communication network to change the communication route.

Figure 7:
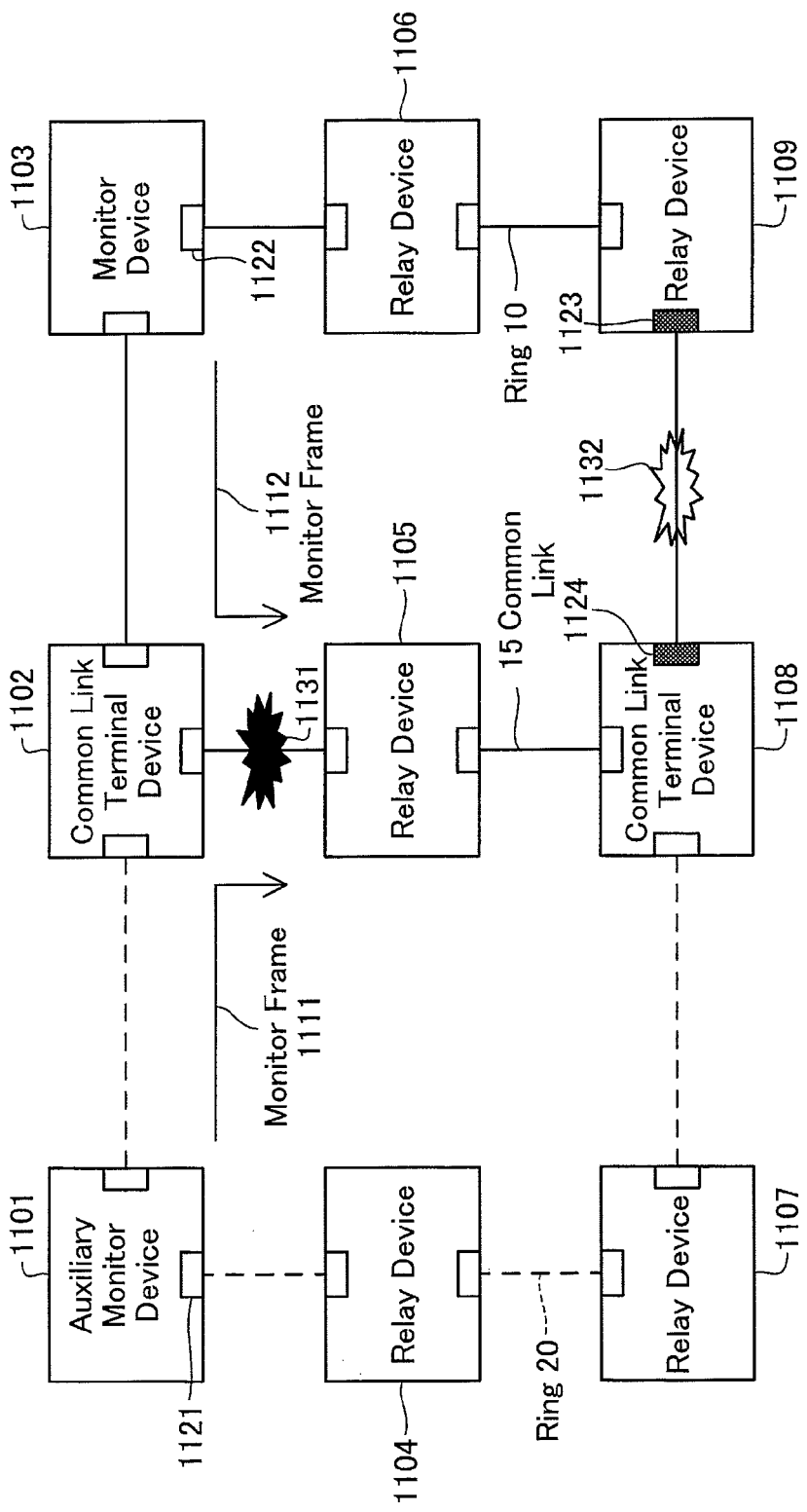
FIG. 7 is a block diagram showing recovery of one failed link from the multi-failure state in the Ethernet communication network of FIG. 1.

FIG. 7 is a block diagram showing recovery of one failed link from the multi-failure state in the Ethernet communication network of FIG. 1. In the state of FIG. 7, in response to recovery of the link between the relay device 1109 and the common link terminal device 1108 from the failure 1132, a specific port 1124 of the common link terminal device 1108 and a specific port 1123 of the relay device 1109 are blocked to avoid the loop.

The failure 1131 occurring on the common link 15 between the common link terminal device 1102 and the relay device 1105, however, still remains. The recovery of the link between the relay device 1109 and the common link terminal device 1108 from the failure 1132 thus does not enable the monitor frame 1112 sent from the monitor device 1103 to go round the ring 10. This means no recovery of the ring 10, so that the monitor device 1103 does not send an FDB flush frame. In response to non-reception of the FDB flush frame, the common link terminal device 1108 and the relay device 1109 keep the respective specific ports 1124 and 1123 blocked. Communication of user frames takes a detour around the blocked specific ports 1124 and 1123 and is thus not affected.

Figure 8:
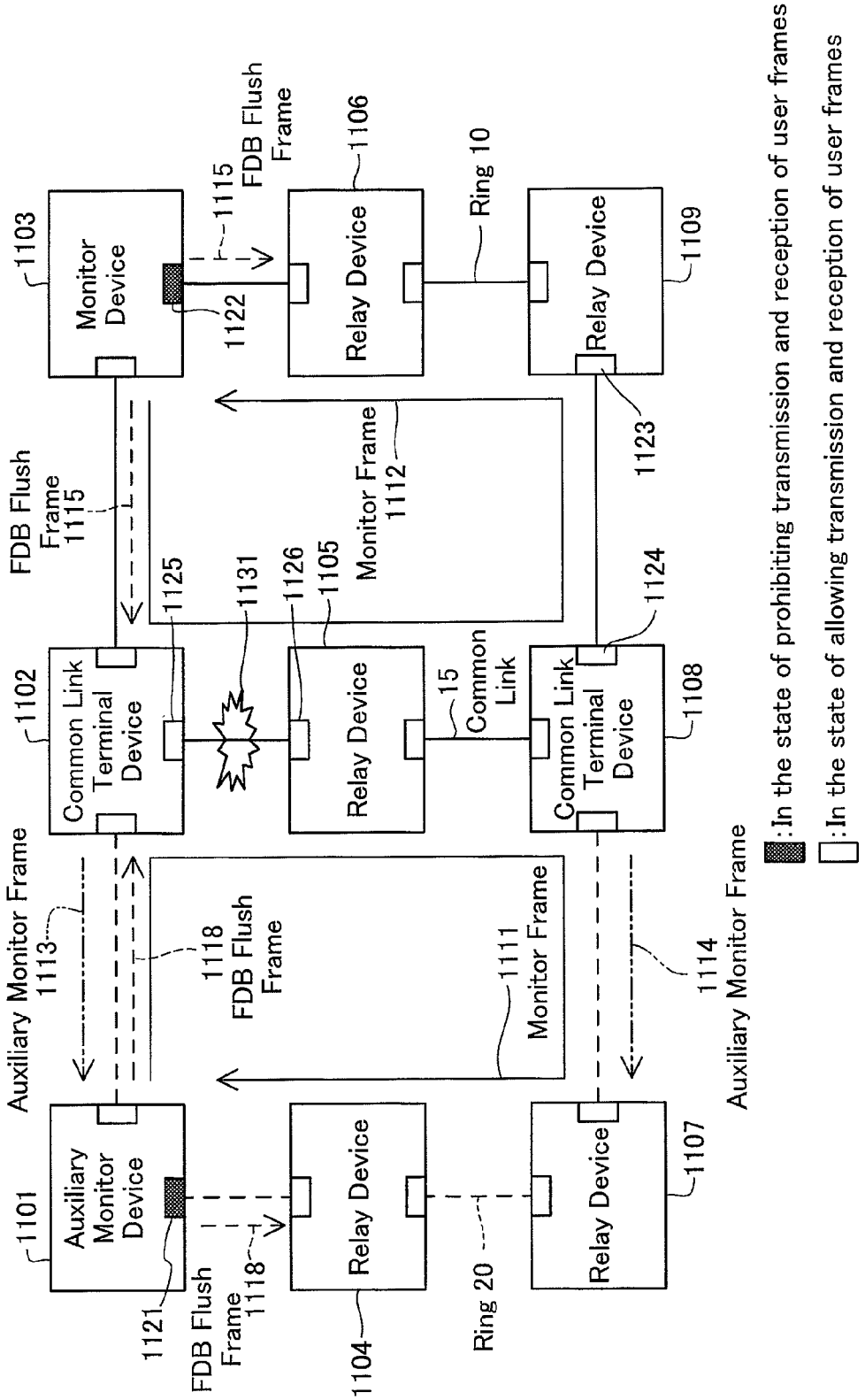
FIG. 8 is a block diagram showing recovery of all links from multiple failures in the Ethernet communication network of FIG. 1.

FIG. 8 is a block diagram showing recovery of all links from multiple failures in the Ethernet communication network of FIG. 1. In the state of FIG. 8, in response to recovery of the common link 15 between the common link terminal device 1102 and the relay device 1105 from the failure 1131, a specific port 1125 of the common link terminal device 1102 and a specific port 1126 of the relay device 1105 are blocked to avoid the loop.

The recovery of the common link 15 between the common link terminal device 1102 and the relay device 1105 enables the monitor frame 1112 sent from the monitor device 1103 and the monitor frame 1111 sent from the auxiliary monitor device 1101 to be returned respectively after circling the ring 10 and after circling the ring 20. In response to reception of the monitor frames 1112 and 1111 sent by the respective self devices, the monitor device 1103 and the auxiliary monitor device 1101 recognize recovery of the ring 10 and recovery of the ring 20. The monitor device 1103 and the auxiliary monitor device 1101 then fall into a recovery deterrent state not to immediately send FDB flush frames after recognition of the recovery of the rings 10 and 20.

In response to the user's operation to cancel out the recovery deterrent state, the monitor device 1103 and the auxiliary monitor device 1101 respectively block the specific port 1122 connecting with the ring 10 and the specific port 1121 connecting with the ring 20 and send the FDB flush frame 1115 and the FDB flush frame 1118. The user is required to cancel out the recovery deterrent state of the auxiliary monitor device 1101 prior to that of the monitor device 1103, in order to avoid the loop.

In response to the user's operation to cancel out the recovery deterrent state of the auxiliary monitor device 1101, the auxiliary monitor device 1101 blocks the specific port 1121 and sends the FDB flush frame 1118. In the common link terminal devices 1102 and 1108, when the communication unit 130 receives the FDB flush frame 1118, the CPU 110 recognizes recovery of the ring 20 from the failure, deletes the pieces of link failure information R2 and R4 correlated to the ring 20 from the link failure information management database 122 set in the memory 120, and controls the communication unit 130 to start transmission of the auxiliary monitor frames 1113 and 1114. The common link terminal device 1102 and the relay device 1105 then cancel the blocking of the respective specific ports 1125 and 1126. In response to reception of the FDB flush frame 1118, the relay devices 1104, 1105, and 1107 and the common link terminal devices 1102 and 1108 delete the FDBs stored therein and urge the communication network to change the communication route. At the moment of recovery, neither of the common link terminal devices 1102 and 1108 transfers the FDB flush frame 1118 to the ring 10.

In response to the user's subsequent operation to cancel out the recovery deterrent state of the monitor device 1103, the monitor device 1103 blocks the specific port 1122 and sends the FDB flush frame 1115. In the common link terminal devices 1102 and 1108, when the communication unit 130 receives the FDB flush frame 1115, the CPU 110 recognizes recovery of the ring 10 from the failure and deletes the pieces of link failure information R1, R3, R5, and R6 correlated to the ring 10 from the link failure information management database 122 set in the memory 120. The common link terminal device 1108 and the relay device 1109 then cancel the blocking of the respective specific ports 1124 and 1123. In response to reception of the FDB flush frame 1115, the relay devices 1105, 1106, and 1109 and the common link terminal devices 1102 and 1108 delete the FDBs stored therein and urge the communication network to change the communication route.

As described above, in the communication network of the first embodiment, in the multiple-failure state with the failure 1131 on the common link 15 and the failure 1132 on another link, the common link terminal devices 1102 and 1108 are controlled to stop transmission of the auxiliary monitor frames 1113 and 1114. In response to non-reception of the monitor frame 1111 for a preset time period and non-reception of the auxiliary monitor frames 1113 and 1114, the auxiliary monitor device 1101 in the ring 20 cancels the blocking of the specific port 1121. Cancellation of the blocking of the specific port 1121 in this manner enables continuous communication without increasing the number of relay devices as passing points of a monitor frame. This arrangement desirably allows continuous communication even in the event of the occurrence of multiple failures in the communication network of the multi-ring structure. Because of no increase in number of the relay devices as the passing points of monitor frame, no countermeasure against the delay of the monitor frame is required.

B. Second Embodiment

Figure 9:
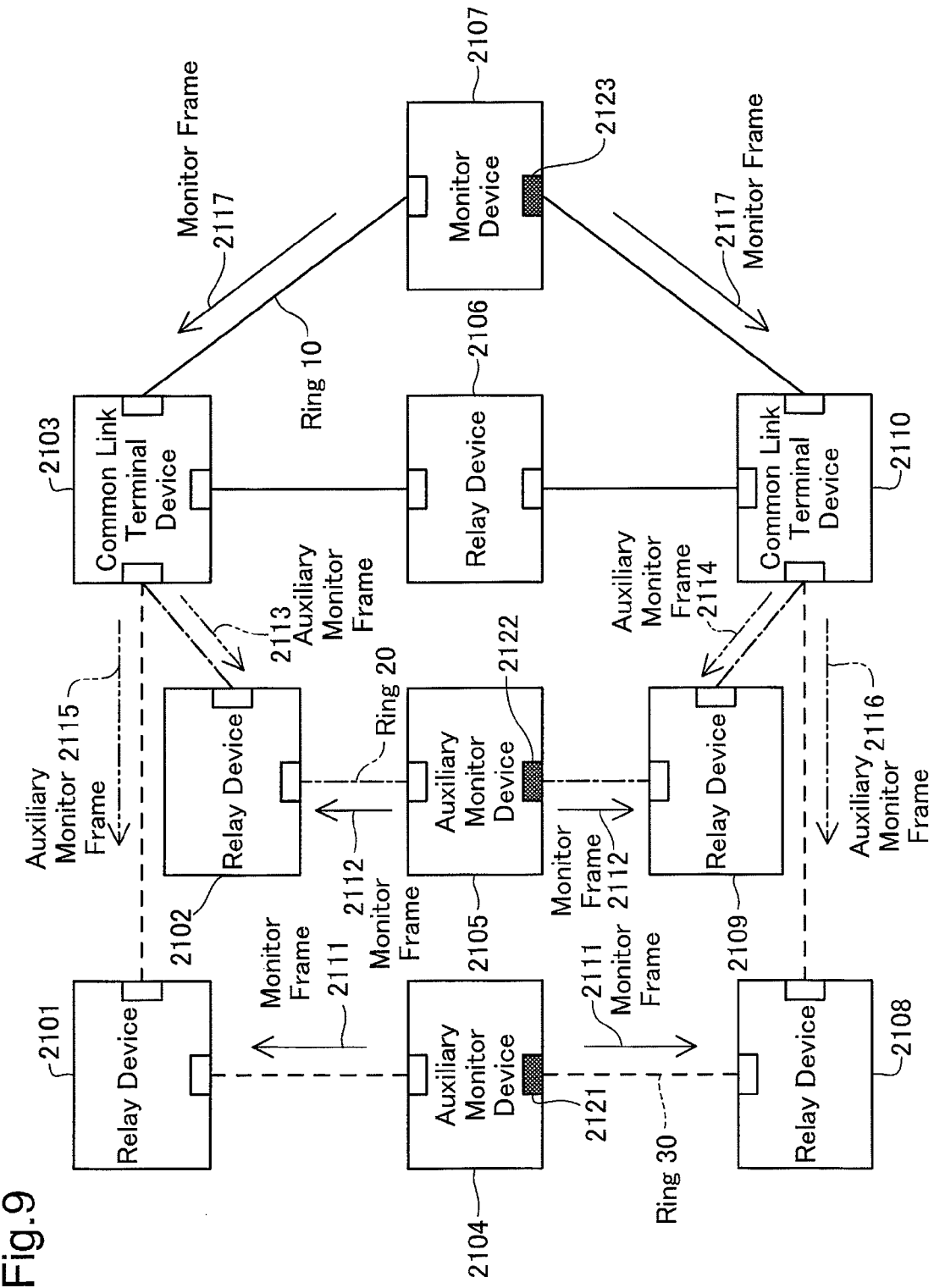
FIG. 9 is a block diagram showing an Ethernet communication network in a multi-ring structure according to a second embodiment of the invention.

FIG. 9 is a block diagram showing an Ethernet communication network in a multi-ring structure according to a second embodiment of the invention. A ring 10 includes a monitor device 2107, a relay device 2106, and common link terminal devices 2103 and 2110. A ring 20 includes an auxiliary monitor device 2105, relay devices 2102 and 2109, the relay device 2106, and the common link terminal devices 2103 and 2110. A ring 30 includes an auxiliary monitor device 2104, relay devices 2101 and 2108, the relay device 2106, and the common link terminal devices 2103 and 2110. IDs '10', '20', and '30' are allocated respectively to the ring 10, to the ring 20, and to the ring 30.

A link connecting the common link terminal device 2103 with the relay device 2106 and the common link terminal device 2110 is a common link shared by the three rings 10, 20, and 30.

In the communication network of the second embodiment, each of the common link terminal devices 2103 and 2110 sends multiple auxiliary monitor frames. More specifically the common link terminal devices 2103 and 2110 respectively send auxiliary monitor frames 2113 and 2114 to the auxiliary monitor device 2105 in the ring 20, while sending auxiliary monitor frames 2115 and 2116 to the auxiliary monitor device 2104 in the ring 30. This assigns the rings 20 and 30 to non-working rings of monitoring the occurrence of a failure on the common link. The auxiliary monitor frames 2113 and 2114 include the ID '20' representing the ring 20 as ID information. The auxiliary monitor frames 2115 and 2116 include the ID '30' representing the ring 30 as ID information.

The monitor device 2107 sends a monitor frame 2117 and receives the monitor frame 2117 returned after circling the ring 10 and sequentially transferred through the constituents of the ring 10, with a view to confirming the normal state of the ring 10. The auxiliary monitor device 2105 sends a monitor frame 2112 and receives the monitor frame 2112 returned after circling the ring 20 and sequentially transferred through the constituents of the ring 20, as well as the auxiliary monitor frames 2113 and 2114 sent by the common link terminal devices 2103 and 2110, with a view to confirming the normal state of the ring 20. The auxiliary monitor device 2104 sends a monitor frame 2111 and receives the monitor frame 2111 returned after circling the ring 30 and sequentially transferred through the constituents of the ring 30, as well as the auxiliary monitor frames 2115 and 2116 sent by the common link terminal devices 2103 and 2110, with a view to confirming the normal state of the ring 30. The monitor frame may be sent individually from both ports connected to the ring as in this embodiment or may be sent from only one port connected to the ring as in the first embodiment.

The relay devices 2101, 2102, 2106, 2108, and 2109 simply work to transfer the frames and have no other operations in the state of no failure.

The structure of the common link terminal devices 2103 and 2110 is identical with the structure of the common link terminal devices 1102 and 1108 shown in FIG. 2 and is not specifically explained here.

Figure 10:
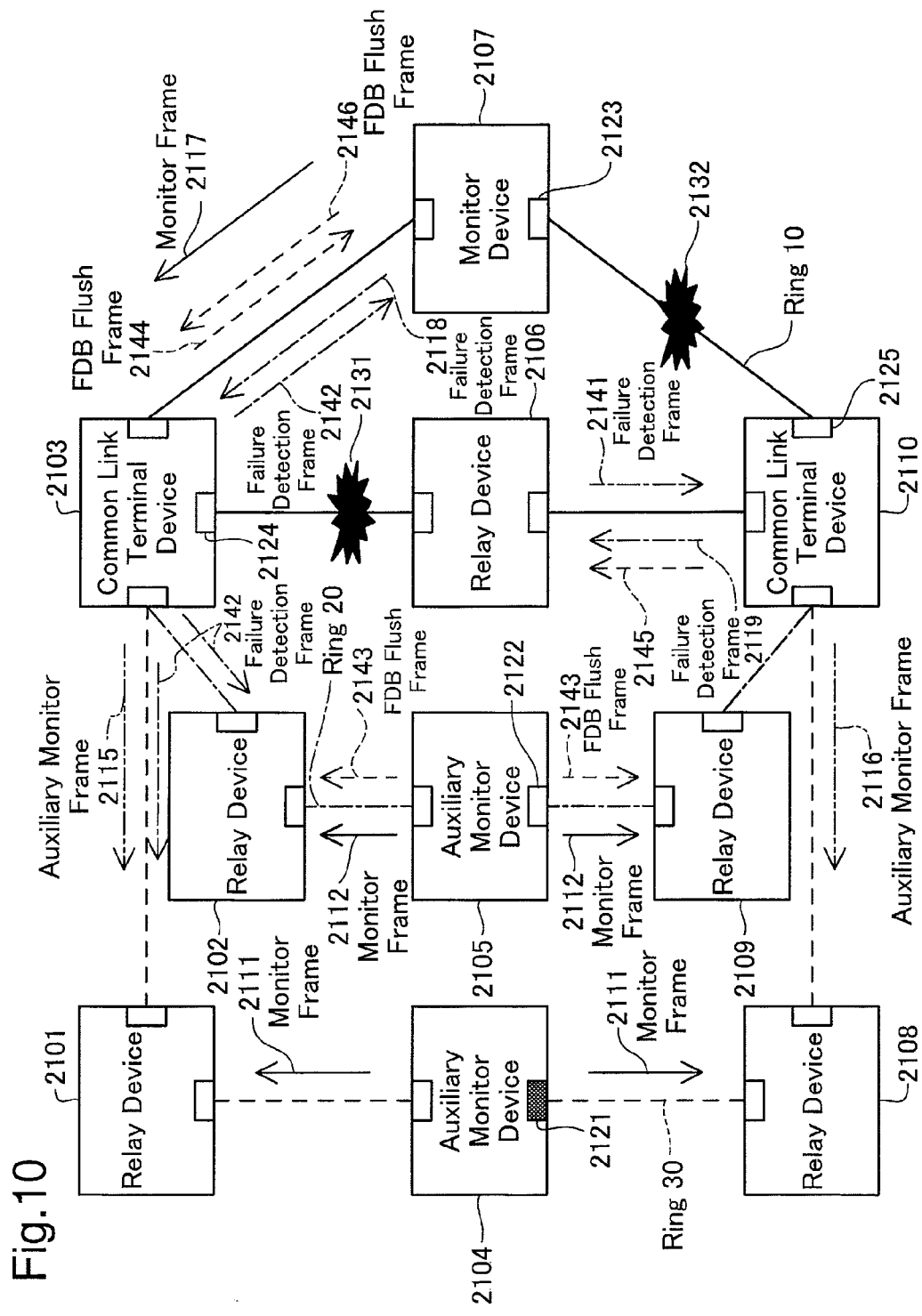
FIG. 10 is a block diagram showing the occurrence of multiple failures in the Ethernet communication network of FIG. 9.

FIG. 10 is a block diagram showing the occurrence of multiple failures in the Ethernet communication network of FIG. 9. In the state of FIG. 10, in the event of the occurrence of a failure 2131 on the common link between the common link terminal device 2103 and the relay device 2106, the relay device 2106 sends a failure detection frame 2141 to all the rings 10, 20, and 30 sharing the common link. The common link terminal device 2103 also sends a failure detection frame 2142 to all the rings 10, 20, and 30 sharing the common link. In the event of the subsequent occurrence of another failure 2132 on a link between the monitor device 2107 and the common link terminal device 2110, the monitor device 2107 sends a failure detection frame 2118 to only the ring 10 including the link. The common link terminal device 2110 also sends a failure detection frame 2119 to only the ring 10 including the link. The monitor device 2107 does not receive the monitor frame 2117 sent by itself and thereby cancels the blocking of a specific port 2123.

FIG. 11 shows the contents of a link failure information management database stored in the common link terminal devices 2103 and 2110 in the state of FIG. 10.

In each of the common link terminal devices 2103 and 2110, in response to reception of a failure detection frame by the communication unit 130 (see FIG. 2) or detection of the occurrence of a link failure via its own port, the CPU 110 registers pieces of link failure information R11 to R18 in the link failure information management database 122 set in the memory 120 as shown in FIG. 11 and executes the multi-failure detection routine of FIG. 5 according to the registered pieces of link failure information R11 to R18.

According to the pieces of link failure information R11 and R14 including the monitoring ring ID '10' and the common ring IDs '10', '20', and '30', the CPU 110 specifies the ring 10 as the ring with the occurrence of a failure and identifies the location of the failure as the common link shared by the rings 10, 20, and 30. According to the pieces of link failure information R12 and R15 including the monitoring ring ID '20' and the common ring IDs '10', '20', and '30', the CPU 110 specifies the ring 20 as the ring with the occurrence of a failure and identifies the location of the failure as the common link shared by the rings 10, 20, and 30. According to the pieces of link failure information R13 and R16 including the monitoring ring ID '30' and the common ring IDs '10', '20', and '30', the CPU 110 specifies the ring 30 as the ring with the occurrence of a failure and identifies the location of the failure as the common link shared by the rings 10, 20, and 30. According to the pieces of link failure information R17 and R18 including the monitoring ring ID '10' and no common ring IDs, the CPU 110 specifies the ring 10 as the ring with the occurrence of a failure and identifies the location of the failure as a link other than the common link.

The CPU 110 first executes the processing of step S102 in the flowchart of FIG. 5. In the state of FIG. 10, with regard to the identical monitoring ring ID '10', the pieces of link failure information R11 and R14 include the common ring IDs '10', '20', and '30' suggesting the occurrence of a failure on the common link shared by the rings 10, 20, and 30, while the pieces of link failure information R17 and R18 include no common ring IDs suggesting the occurrence of a failure on a link other than the common link. Based on detection of the two different locations with regard to the identical monitoring ring ID '10', it is determined that the ring 10 has failures at two different positions. The CPU 110 accordingly determines the occurrence of failures at multiple different locations with regard to an identical monitoring ring ID at step S102 and proceeds to step S104.

In the state of FIG. 10, among the auxiliary monitor frames sent by the common link terminal devices 2103 and 2110, the auxiliary monitor frames 2113 and 2114 include the ID '20' representing the ring 20 as the ID information, whereas the auxiliary monitor frame 2115 and 2116 include the ID '30' representing the ring 30 as the ID information. The pieces of link failure information R12 and R15 include the monitoring ring ID '20', whereas the pieces of link failure information R13 and R16 include the monitoring ring ID '30'. The CPU 110 accordingly determines that any of the monitoring ring IDs is identical with the ID represented by the ID information included in the auxiliary monitor frames at step S104 and proceeds to step S106.

In the state of FIG. 10, the pieces of link failure information R11 to R16 include the common ring IDs '10', '20', and '30', and there is no ID having a greater number than the IDs '20' and '30' represented by the ID information included in the auxiliary monitor frames. The CPU 110 accordingly determines that there is no ring in failure having an ID greater in number than the IDs represented by the ID information in the auxiliary monitor frames at step S106 and proceeds to step S108.

In the state of FIG. 10, the pieces of link failure information R17 and R18 include no common ring IDs. The CPU 110 accordingly detects the occurrence of a failure on a link other than the common link at step S108 and proceeds to step S110.

In the state of FIG. 10, the common link terminal devices 2103 and 2110 send auxiliary monitor frames to the two rings 20 and 30. The CPU 110 accordingly identifies transmission of multiple auxiliary monitor frames at step S110 and proceeds to step S112.

The CPU 110 stops transmission of the auxiliary monitor frames to a ring having a smaller ID number among the common ring IDs at step S112. In the state of FIG. 10, the pieces of link failure information R11 to R16 include the common ring IDs '10', '20', and '30'. Namely a failure occurs on the common link shared by the three rings 10, 20, and 30. Among these three rings 10, 20, and 30, the rings 20 and 30 are the receivers of the auxiliary monitor frames and the ring 20 has the smaller ID number. The common link terminal devices 2103 and 2110 accordingly stop the transmission of the auxiliary monitor frames 2113 and 2114 to the ring 20 of the smaller ID number, while keeps the transmission of the auxiliary monitor frames 2114 and 2116 to the ring 30 of the greater ID number.

In response to non-reception of the monitor frame 2117 sent by itself for a preset time period, the monitor device 2107 in the ring 10 recognizes the occurrence of a failure on the ring 10, cancels the blocking of the specific port 2123, and sends an FDB flush frame 2146.

In response to non-reception of the auxiliary monitor frames from the common link terminal devices 2103 and 2110, the auxiliary monitor device 2105 in the ring 20 recognizes the occurrence of a failure on the ring 20, cancels the blocking of a specific port 2122, and sends an FDB flush frame 2143.

In response to reception of the FDB flush frame, the relay devices 2102 and 2109 and the common link terminal devices 2103 and 2110 delete the FDBs stored therein and urge the communication network to change the communication route.

In response to reception of the FDB flush frame 2143, the common link terminal devices 2103 and 2110 send FDB flush frames 2144 and 2145 to the ring 10. The relay devices 2107 and 2106 receive the FDB flush frames 2144 and 2145, delete the FDBs stored therein, and urge the communication network to change the communication route.

Even in the occurrence of the failures 2131 and 2132, the relay devices 2101 and 2108 and the auxiliary monitor device 2104 in the ring 30 enable continuous communication without any specified operations.

As described above, in the communication network of the second embodiment where the common link terminal devices 2103 and 2110 individually send multiple auxiliary monitor frames, in the multiple-failure state with the failure 2131 on the common link and the failure 2132 on another link, the common link terminal devices 2103 and 2110 are controlled to stop transmission of the auxiliary monitor frames 2113 and 2114 to the ring 20 of the smaller ID number. In response to non-reception of the monitor frame 2112 for a preset time period and non-reception of the auxiliary monitor frames 2113 and 2114, the auxiliary monitor device 2105 in the ring 20 cancels the blocking of the specific port 2122. Cancellation of the blocking of the specific port 2121 in this manner enables continuous communication without increasing the number of relay devices as passing points of a monitor frame. This arrangement exerts the similar effects to those of the first embodiment described above.

C. Third Embodiment

Figure 12:
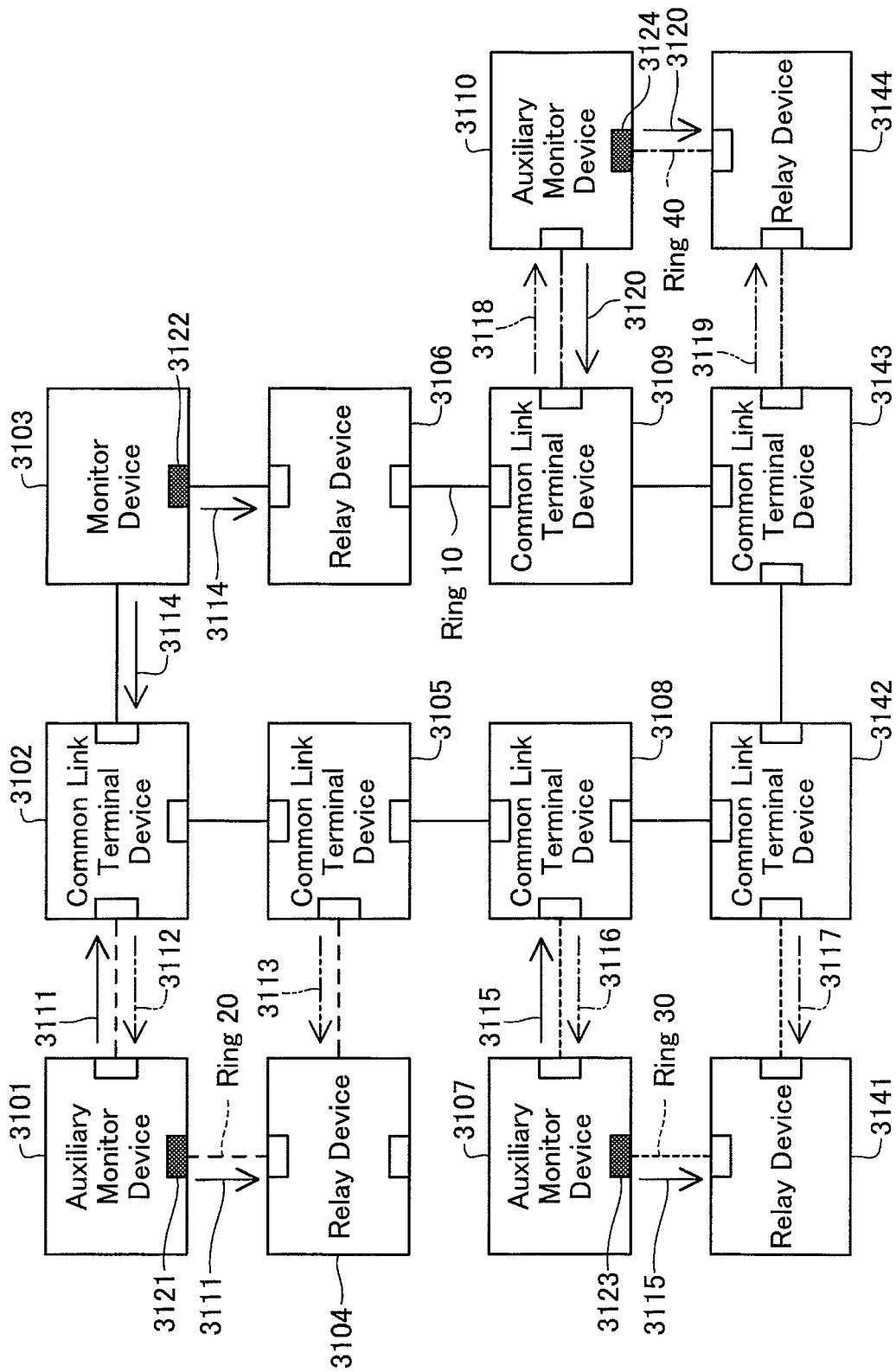
FIG. 12 is a block diagram showing an Ethernet communication network in a multi-ring structure according to a third embodiment of the invention.

FIG. 12 is a block diagram showing an Ethernet communication network in a multi-ring structure according to a third embodiment of the invention. The communication network of the third embodiment has multiple common links. A ring 10 includes a monitor device 3103, a relay device 3106, and common link terminal devices 3102, 3105, 3108, 3109, 3142, and 3143. A ring 20 includes an auxiliary monitor device 3101, a relay device 3104, and the common link terminal devices 3102 and 3105. A ring 30 includes an auxiliary monitor device 3107, a relay device 3141, and the common link terminal devices 3108 and 3142. A ring 40 includes an auxiliary monitor device 3110, a relay device 3144, and the common link terminal devices 3109 and 3143. IDs '10', '20', '30', and '40' are allocated respectively to the ring 10, to the ring 20, to the ring 30, and to the ring 40.

A link between the common link terminal devices 3102 and 3105 is a common link shared by the rings 10 and 20. A link between the common link terminal devices 3108 and 3142 is a common link shared by the rings 10 and 30. A link between the common link terminal devices 3019 and 3143 is a common link shared by the rings 10 and 40.

The common link terminal devices 3102 and 3105 respectively send auxiliary monitor frames 3112 and 3113 to the auxiliary monitor device 3101 in the ring 20. The common link terminal devices 3108 and 3142 respectively send auxiliary monitor frames 3116 and 3117 to the auxiliary monitor device 3107 in the ring 30. The common link terminal devices 3109 and 3143 respectively send auxiliary monitor frames 3118 and 3119 to the auxiliary monitor device 3110 in the ring 40. This assigns the rings 20, 30, and 40 to non-working rings of monitoring the occurrence of a failure on the respective common links. The auxiliary monitor frames 3112 and 3113 include the ID '20' representing the ring 20 as ID information. The auxiliary monitor frames 3116 and 3117 include the ID '30' representing the ring 30 as ID information. The auxiliary monitor frames 3118 and 3119 include the ID '40' representing the ring 40 as ID information.

The monitor device 3103 sends a monitor frame 3114 and receives the monitor frame 3114 returned after circling the ring 10 and sequentially transferred through the constituents of the ring 10, with a view to confirming the normal state of the ring 10. The auxiliary monitor device 3101 sends a monitor frame 3111 and receives the monitor frame 3111 returned after circling the ring 20 and sequentially transferred through the constituents of the ring 20, as well as the auxiliary monitor frames 3112 and 3113 sent by the common link terminal devices 3102 and 3105, with a view to confirming the normal state of the ring 20. The auxiliary monitor device 3107 sends a monitor frame 3115 and receives the monitor frame 3115 returned after circling the ring 30 and sequentially transferred through the constituents of the ring 30, as well as the auxiliary monitor frames 3116 and 3117 sent by the common link terminal devices 3108 and 3142, with a view to confirming the normal state of the ring 30. The auxiliary monitor device 3110 sends a monitor frame 3120 and receives the monitor frame 3120 returned after circling the ring 40 and sequentially transferred through the constituents of the ring 40, as well as the auxiliary monitor frames 3118 and 3119 sent by the common link terminal devices 3109 and 3143, with a view to confirming the normal state of the ring 40. The monitor frame may be sent individually from both ports connected to the ring as in this embodiment or may be sent from only one port connected to the ring as in the first embodiment.

The relay devices 3104, 3106, 3141, and 3144 simply work to transfer the frames and have no other operations in the state of no failure.

The structure of the common link terminal devices 3102, 3105, 3108, 3109, 3142, and 3143 is identical with the structure of the common link terminal devices 1102 and 1108 shown in FIG. 2 and is not specifically explained here.

Figure 13:
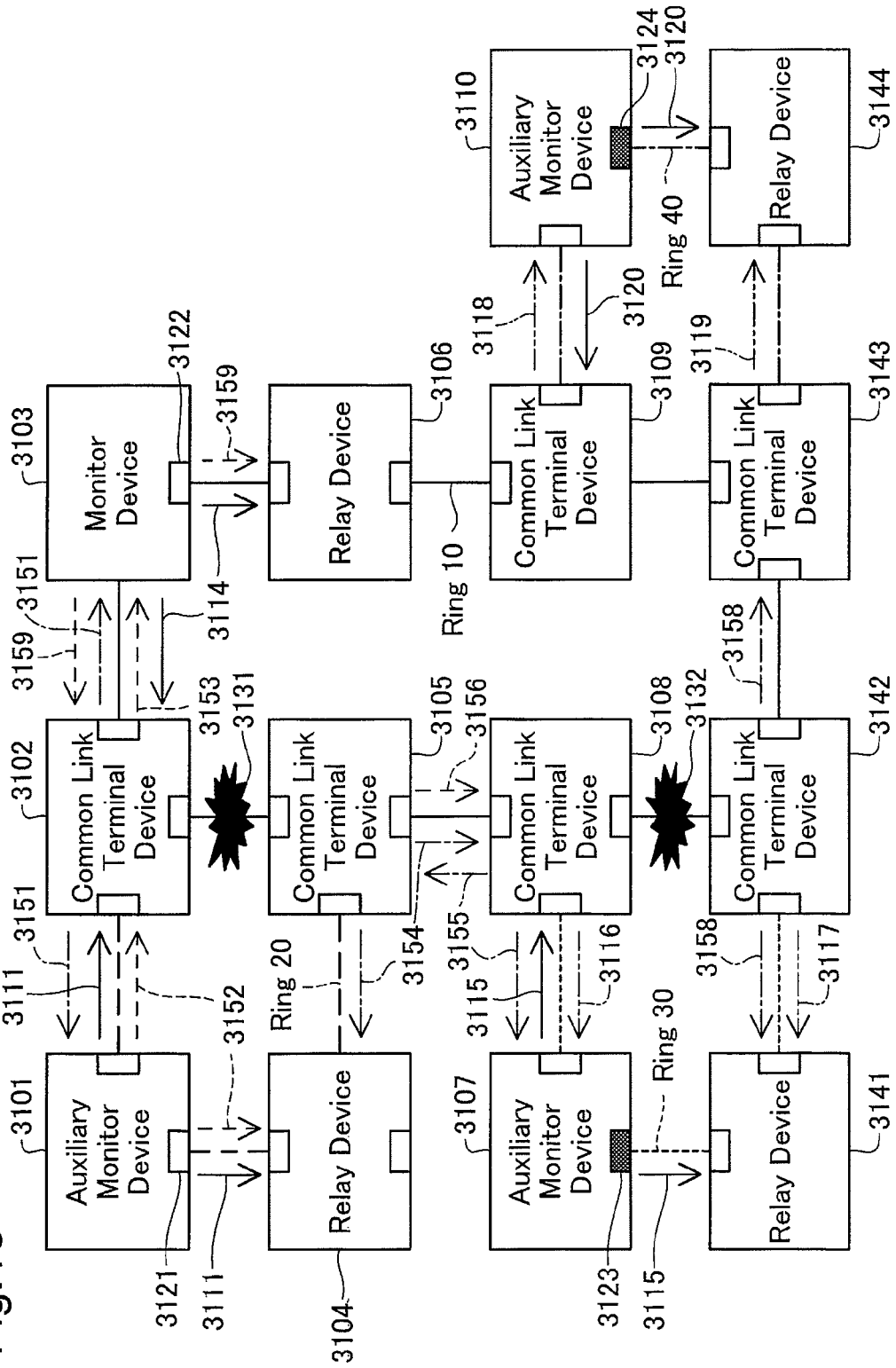
FIG. 13 is a block diagram showing the occurrence of multiple failures in the Ethernet communication network of FIG. 12.

FIG. 13 is a block diagram showing the occurrence of multiple failures in the Ethernet communication network of FIG. 12. In the state of FIG. 13, in the event of the occurrence of a failure 3131 on the common link between the common link terminal devices 3102 and 3105, the common link terminal device 3102 sends a failure detection frame 3151 to all the rings 10 and 20 sharing the common link. The common link terminal device 3105 also sends a failure detection frame 3154 to all the rings 10 and 20 sharing the common link. In the event of the subsequent occurrence of another failure 3132 on the common link between the common link terminal devices 3108 and 3142, the common link terminal device 3108 sends a failure detection frame 3155 to all the rings 10 and 30 sharing the common link. The common link terminal 3142 also sends a failure detection frame 3158 to all the rings 10 and 30 sharing the common link.

FIG. 14 shows the contents of a link failure information management database stored in the common link terminal device 3102 in the state of FIG. 13. FIG. 15 shows the contents of a link failure information management database stored in the common link terminal device 3105 in the state of FIG. 13.

In the common link terminal device 3102, in response to reception of the failure detection frames 3154 and 3158 by the communication unit 130 or detection of the occurrence of a link failure via its own port, the CPU 110 registers pieces of link failure information R21 to R25 in the link failure information management database 122 set in the memory 120 as shown in FIG. 14. In the common link terminal device 3105, in response to reception of the failure detection frames 3151 and 3155 by the communication unit 130 or detection of the occurrence of a link failure via its own port, the CPU 110 registers pieces of link failure information R21 to R24 and R26 in the link failure information management database 122 set in the memory 120 as shown in FIG. 15. The CPUs 110 in the common link terminal devices 3102 and 3105 then execute the multi-failure detection routine of FIG. 5 according to the registered pieces of link failure information.

The CPU 110 first executes the processing of step S102. In the state of FIG. 13, with regard to the identical monitoring ring ID '10', the pieces of link failure information R21 and R23 include the common ring IDs '10' and '20' suggesting the occurrence of a failure on the common link shared by the rings 10 and 20, while the pieces of link failure information R25 and R26 include the common ring IDs '10' and '30' suggesting the occurrence of a failure on the common link shared by the rings 10 and 30. Based on detection of the two different locations with regard to the identical monitoring ring ID '10', it is determined that the ring 10 has failures at two different positions. The CPU 110 accordingly determines the occurrence of failures at multiple different locations with regard to an identical monitoring ring ID at step S102 and proceeds to step S104.

In the state of FIG. 13, the auxiliary monitor frames 3112 and 3113 sent by the common link terminal devices 3102 and 3105 include the ID '20' representing the ring 20 as the ID information, while the pieces of link failure information R22 and R24 include the monitoring ring ID '20'. The CPU 110 accordingly determines that any of the monitoring ring IDs is identical with the ID represented by the ID information included in the auxiliary monitor frames at step S104 and proceeds to step S106.

In the state of FIG. 13, the pieces of link failure information R21 to R24 include the common ring IDs '10' and '20' and the pieces of link failure information R25 and R26 include the common ring IDs '10' and '30'. There is a number greater than the ID '20' represented by the ID information included in the auxiliary monitor frames 3112 and 3113. The CPU 110 accordingly determines that there is a ring in failure having an ID greater in number than the ID represented by the ID information in the auxiliary monitor frames 3112 and 3113 at step S106 and proceeds to step S110.

In the state of FIG. 13, the common link terminal devices 3102 and 3105 send the auxiliary monitor frame 3112 or 3113 to only one ring 20. The CPU 110 accordingly identifies no transmission of multiple auxiliary monitor frames at step S110 and proceeds to step S 14.

The CPU 110 controls the communication unit 130 to stop the transmission of the auxiliary monitor frames 3112 and 3113 at step S114. The common link terminal devices 3102 and 3105 accordingly stop the transmission of the auxiliary monitor frames 3112 and 3113.

In response to non-reception of the monitor frame 3114 sent by itself for a preset time period, the monitor device 3103 in the ring 10 recognizes the occurrence of a failure on the ring 10, cancels the blocking of a specific port 3122, and sends an FDB flush frame 3159.

In response to non-reception of the auxiliary monitor frames from the common link terminal devices 3102 and 3105, the auxiliary monitor device 3101 in the ring 20 recognizes the occurrence of a failure on the ring 20, cancels the blocking of a specific port 3121, and sends an FDB flush frame 3152.

In response to reception of the FDB flush frame 3152, the relay device 3104 deletes the FDB stored therein and urges the communication network to change the communication route.

In response to reception of the FDB flush frame 3152, the common link terminal devices 3102 and 3105 delete the FDBs stored therein and send FDB flush frames 3153 and 3156 to the ring 10. The relay device 3106 and the common link terminal devices 3108, 3142, 3143, and 3109, and the monitor device 3103 receive these FDB flush frames 3153 and 3156, delete the FDBs stored therein, and urge the communication network to change the communication route.

FIG. 16 shows the contents of a link failure information management database stored in the common link terminal device 3108 in the state of FIG. 13. FIG. 17 shows the contents of a link failure information management database stored in the common link terminal device 3142 in the state of FIG. 13.

In the common link terminal device 3108, in response to reception of the failure detection frames 3154 and 3158 by the communication unit 130 or detection of the occurrence of a link failure via its own port, the CPU 110 registers pieces of link failure information R31 to R35 in the link failure information management database 122 set in the memory 120 as shown in FIG. 16. In the common link terminal device 3142, in response to reception of the failure detection frames 3151 and 3155 by the communication unit 130 or detection of the occurrence of a link failure via its own port, the CPU 110 registers pieces of link failure information R31 to R34 and R36 in the link failure information management database 122 set in the memory 120 as shown in FIG. 17. The CPUs 110 in the common link terminal devices 3108 and 3142 then execute the multi-failure detection routine of FIG. 5 according to the registered pieces of link failure information.

The CPU 110 first executes the processing of step S102. In the state of FIG. 13, with regard to the identical monitoring ring ID '10', the pieces of link failure information R31 and R33 include the common ring IDs '10' and '30' suggesting the occurrence of a failure on the common link shared by the rings 10 and 30, while the pieces of link failure information R35 and R36 include the common ring IDs '10' and '20' suggesting the occurrence of a failure on the common link shared by the rings 10 and 20. Based on detection of the two different locations with regard to the identical monitoring ring ID '10', it is determined that the ring 10 has failures at two different positions. The CPU 110 accordingly determines the occurrence of failures at multiple different locations with regard to an identical monitoring ring ID at step S102 and proceeds to step S104.

In the state of FIG. 13, the auxiliary monitor frames 3116 and 3117 sent by the common link terminal devices 3108 and 3142 include the ID '30' representing the ring 30 as the ID information, while the pieces of link failure information R32 and R34 include the monitoring ring ID '30'. The CPU 110 accordingly determines that any of the monitoring ring IDs is identical with the ID represented by the ID information included in the auxiliary monitor frames at step S104 and proceeds to step S106.

In the state of FIG. 13, the pieces of link failure information R31 to R34 include the common ring IDs '10' and '30' and the pieces of link failure information R35 and R36 include the common ring IDs '10' and '20'. There is no ID having a greater number than the ID '30' represented by the ID information included in the auxiliary monitor frames 3116 and 3117. The CPU 110 accordingly determines that there is no ring in failure having an ID greater in number than the ID represented by the ID information in the auxiliary monitor frames 3116 and 3117 at step S106 and proceeds to step S108.

In the state of FIG. 13, no null data is given as the common ring IDs in any of the pieces of link failure information R31 to R36. The CPU 110 accordingly detects no occurrence of a failure on any link other than the common link at step S108 and proceeds to step S116.

The CPU 110 controls the communication unit 130 to continue transmission of the auxiliary monitor frames 3116 and 3117 at step S116.

FIG. 18 shows the contents of a link failure information management database stored in the common link terminal devices 3109 and 3143 in the state of FIG. 13.

In the common link terminal devices 3109 and 3143, in response to reception of the failure detection frames 3151 and 3158 by the communication unit 130, the CPU 110 registers pieces of link failure information R41 and R42 in the link failure information management database 122 set in the memory 120 as shown in FIG. 18. The CPUs 110 in the common link terminal devices 3109 and 3143 then execute the multi-failure detection routine of FIG. 5 according to the registered pieces of link failure information.

The CPU 110 first executes the processing of step S102. In the state of FIG. 13, with regard to the identical monitoring ring ID '10', the piece of link failure information R41 includes the common ring IDs '10' and '20' suggesting the occurrence of a failure on the common link shared by the rings 10 and 20, while the piece of link failure information R42 includes the common ring IDs '10' and '30' suggesting the occurrence of a failure on the common link shared by the rings 10 and 30. Based on detection of the two different locations with regard to the identical monitoring ring ID '10', it is determined that the ring 10 has failures at two different positions. The CPU 110 accordingly determines the occurrence of failures at multiple different locations with regard to an identical monitoring ring ID at step S102 and proceeds to step S104.

In the state of FIG. 13, the auxiliary monitor frames 3118 and 3119 sent by the common link terminal devices 3109 and 3143 include the ID '40' representing the ring 40 as the ID information, while the pieces of link failure information R41 and R42 include the monitoring ring ID '10'. The CPU 110 accordingly determines that none of the monitoring ring IDs is identical with the ID represented by the ID information included in the auxiliary monitor frames at step S104 and proceeds to step S116.

The CPU 110 controls the communication unit 130 to continue transmission of the auxiliary monitor frames 3118 and 3119 at step S116.

Even in the occurrence of the failures 3131 and 3132, the respective devices included in the ring 30 or in the ring 40 enable continuous communication without any specified operations.

As described above, in the communication network of the third embodiment having multiple common links, in the multiple-failure state with the failures 3131 and 3132 on plural common links, the common link terminal devices 3102 and 3105 are controlled to stop transmission of the auxiliary monitor frames 3112 and 3113 to the ring 20 of the smaller ID number. In response to non-reception of the monitor frame 3111 for a preset time period and non-reception of the auxiliary monitor frames 3112 and 3113, the auxiliary monitor device 3101 in the ring 20 cancels the blocking of the specific port 3121. Cancellation of the blocking of the specific port 3121 in this manner enables continuous communication even in the event of multiple failures on plural common links without increasing the number of relay devices as passing points of a monitor frame. This arrangement exerts the similar effects to those of the first and the second embodiments described above.

D. Fourth Embodiment

Figure 19:
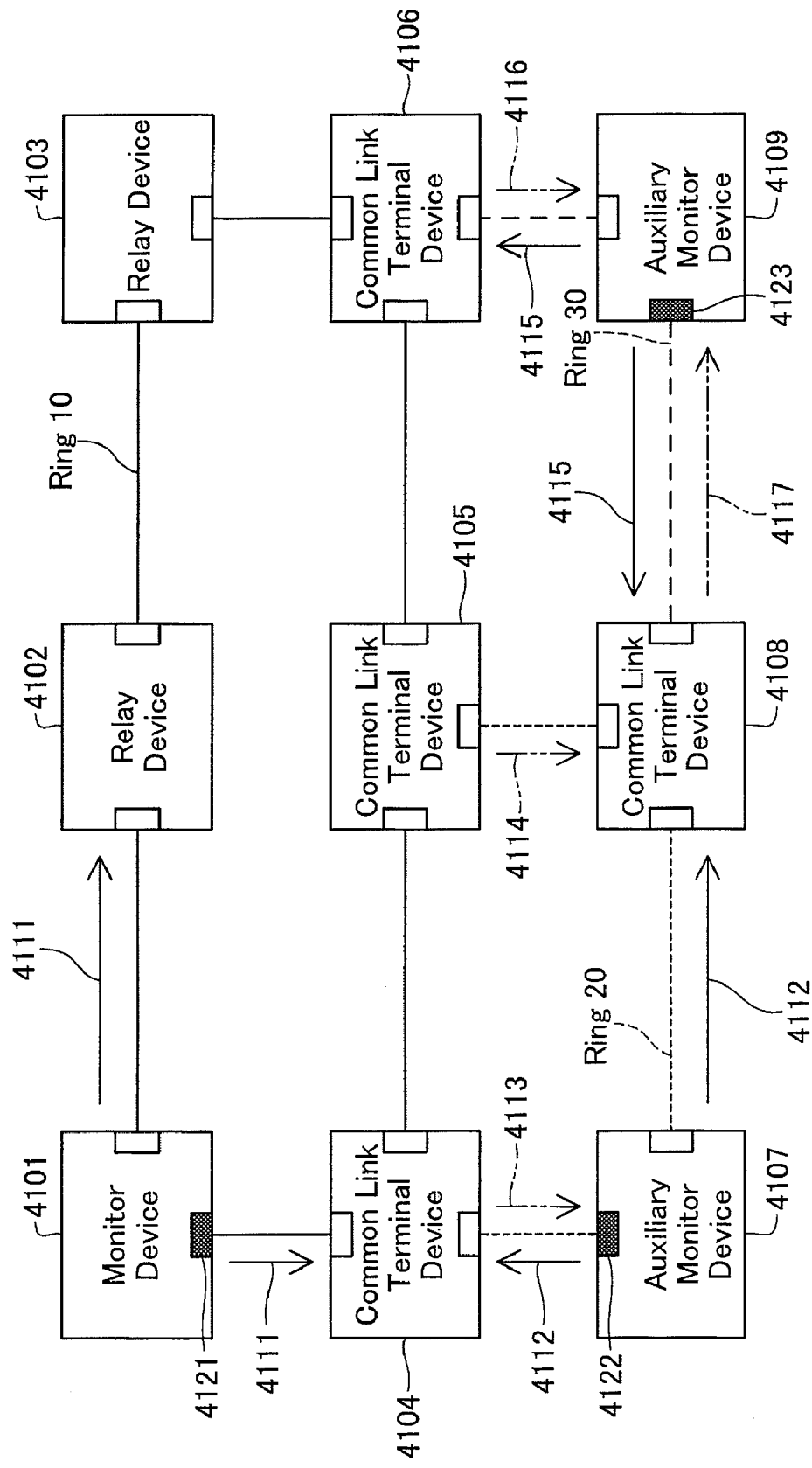
FIG. 19 is a block diagram showing an Ethernet communication network in a multi-ring structure according to a fourth embodiment of the invention.

FIG. 19 is a block diagram showing an Ethernet communication network in a multi-ring structure according to a fourth embodiment of the invention. The communication network of the fourth embodiment has a large ring covering over multiple rings. A ring 10 includes a monitor device 4101, relay devices 4102 and 4103, and common link terminal devices 4104, 4105, and 4106. A ring 20 includes an auxiliary monitor device 4107, the common link terminal devices 4104 and 4105, and another common link terminal device 4108. A ring 30 includes an auxiliary monitor device 4109 and the common link terminal devices 4105, 4106, and 4108. IDs '10', '20', and '30' are allocated respectively to the ring 10, to the ring 20, and to the ring 30.

A link between the common link terminal devices 4104 and 4105 is a common link shared by the rings 10 and 20. A link between the common link terminal devices 4105 and 4106 is a common link shared by the rings 10 and 30. A link between the common link terminal devices 4105 and 4108 is a common link shared by the rings 20 and 30.

The common link terminal devices 4104 and 4105 respectively send auxiliary monitor frames 4113 and 4114 to the auxiliary monitor device 4107 in the ring 20. The common link terminal devices 4106 and 4108 respectively send auxiliary monitor frames 4116 and 4117 to the auxiliary monitor device 4109 in the ring 30. This assigns the rings 20 and 30 to non-working rings of monitoring the occurrence of a failure on the respective common links. The auxiliary monitor frames 4113 and 4114 include the ID '20' representing the ring 20 as ID information. The auxiliary monitor frames 4116 and 4117 include the ID '30' representing the ring 30 as ID information.

The monitor device 4101 sends a monitor frame 4111 and receives the monitor frame 4111 returned after circling the ring 10 and sequentially transferred through the constituents of the ring 10, with a view to confirming the normal state of the ring 10. The auxiliary monitor device 4107 sends a monitor frame 4112 and receives the monitor frame 4112 returned after circling the ring 20 and sequentially transferred through the constituents of the ring 20, as well as the auxiliary monitor frames 4113 and 4114 sent by the common link terminal devices 4104 and 4105, with a view to confirming the normal state of the ring 20. The auxiliary monitor device 4109 sends a monitor frame 4115 and receives the monitor frame 4115 returned after circling the ring 30 and sequentially transferred through the constituents of the ring 30, as well as the auxiliary monitor frames 4116 and 4117 sent by the common link terminal devices 4106 and 4108, with a view to confirming the normal state of the ring 30. The monitor frame may be sent individually from both ports connected to the ring as in this embodiment or may be sent from only one port connected to the ring as in the first embodiment.

The relay devices 4102 and 4103 simply work to transfer the frames and have no other operations in the state of no failure.

The structure of the common link terminal devices 4104, 4105, 4106, and 4108 is identical with the structure of the common link terminal devices 1102 and 1108 shown in FIG. 2 and is not specifically explained here.

Figure 20:
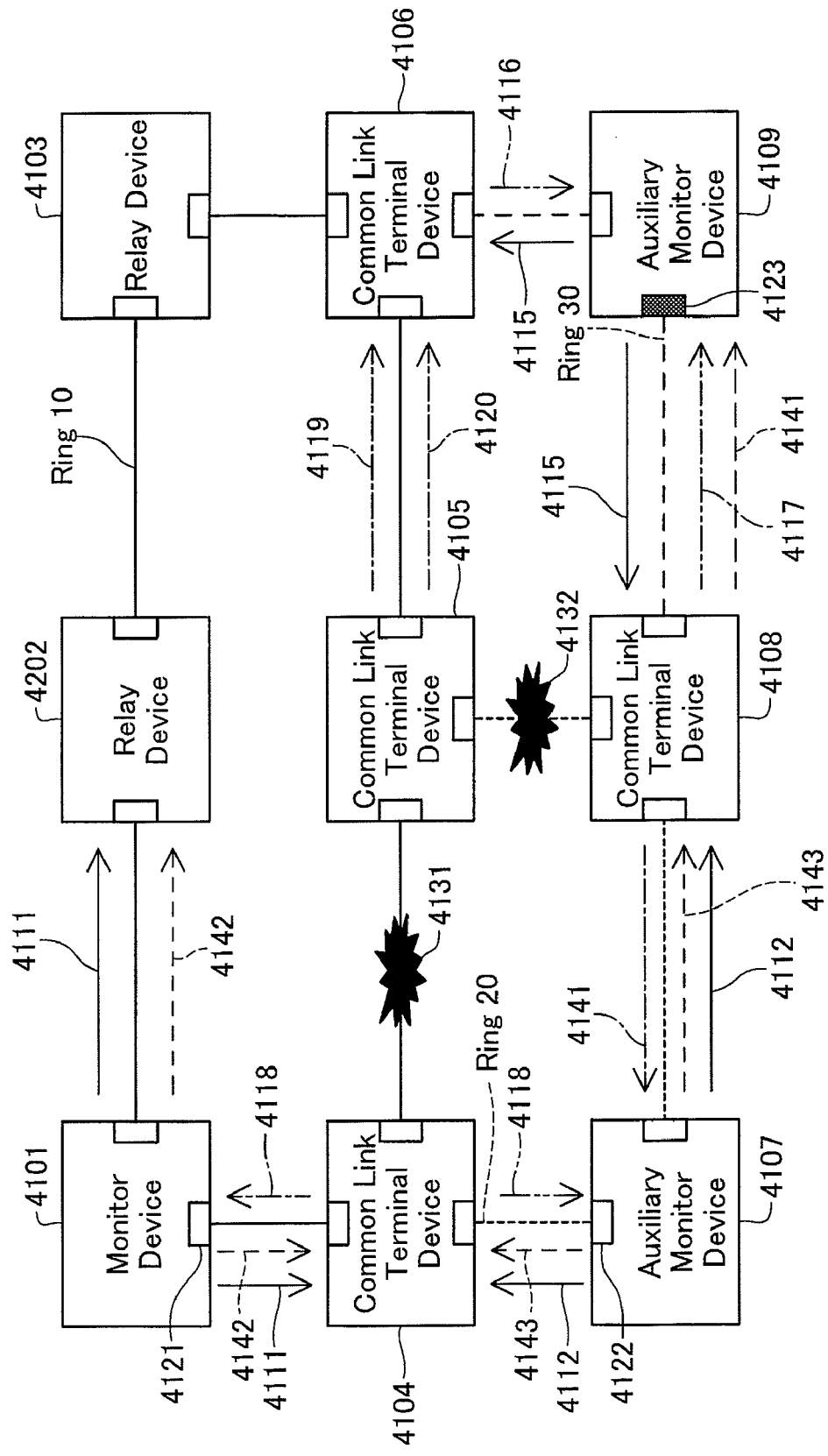
FIG. 20 is a block diagram showing the occurrence of multiple failures in the Ethernet communication network of FIG. 19.

FIG. 20 is a block diagram showing the occurrence of multiple failures in the Ethernet communication network of FIG. 19. In the state of FIG. 20, in the event of the occurrence of a failure 4131 on the common link between the common link terminal devices 4104 and 4105, the common link terminal device 4104 sends a failure detection frame 4118 to all the rings 10 and 20 sharing the common link. The common link terminal device 4105 also sends a failure detection frame 4119 to all the rings 10 and 20 sharing the common link. In the event of the subsequent occurrence of another failure 4132 on the common link between the common link terminal devices 4105 and 4108, the common link terminal device 4105 sends a failure detection frame 4120 to all the rings 20 and 30 sharing the common link. All the links from the common link terminal device 4105 to the ring 20, however, have failures, so that the failure detection frame 4120 is not actually sent to the ring 20. The common link terminal device 4108 sends a failure detection frame 4141 to all the rings 20 and 30 sharing the common link.

FIG. 21 shows the contents of a link failure information management database stored in the common link terminal device 4104 in the state of FIG. 20. FIG. 22 shows the contents of a link failure information management database stored in the common link terminal device 4105 in the state of FIG. 20. FIG. 23 shows the contents of a link failure information management database stored in the common link terminal device 4106 in the state of FIG. 20. FIG. 24 shows the contents of a link failure information management database stored in the common link terminal device 4108 in the state of FIG. 20.

In the common link terminal device 4104, in response to reception of the failure detection frames 4119 and 4141 by the communication unit 130 or detection of the occurrence of a link failure via its own port, the CPU 110 registers pieces of link failure information R51 to R55 in the link failure information management database 122 set in the memory 120 as shown in FIG. 21. In the common link terminal device 4105, in response to reception of the failure detection frames 4118 and 4141 by the communication unit 130 or detection of the occurrence of a link failure via its own port, the CPU 110 registers pieces of link failure information R51 to R54 and R56 to R58 in the link failure information management database 122 set in the memory 120 as shown in FIG. 22. In the common link terminal device 4106, in response to reception of the failure detection frames 4118, 4119, 4120, and 4141 by the communication unit 130 or detection of the occurrence of a link failure via its own port, the CPU 110 registers pieces of link failure information R51, R53, and R57 to R59 in the link failure information management database 122 set in the memory 120 as shown in FIG. 23. In the common link terminal device 4108, in response to reception of the failure detection frames 4118 and 4120 by the communication unit 130 or detection of the occurrence of a link failure via its own port, the CPU 110 registers pieces of link failure information R52, R54, R56 to R58, and R60 in the link failure information management database 122 set in the memory 120 as shown in FIG. 24. The CPUs 110 in the common link terminal devices 4104, 4105, 4106, and 4108 then execute the multi-failure detection routine of FIG. 5 according to the registered pieces of link failure information.

In the common link terminal device 4106, the CPU 110 executes the processing of step S102. As shown in FIG. 23, in the state of FIG. 20, with regard to the identical monitoring ring ID '10', both the pieces of link failure information R51 and R53 include the common ring IDs '10' and '20' suggesting the occurrence of a failure on the common link shared by the rings 10 and 20. With regard to the identical monitoring ring ID '30', all the pieces of link failure information R57 to R59 include the common ring IDs '20' and '30' suggesting the occurrence of a failure on the common link shared by the rings 20 and 30. Namely there are no failures occurring at multiple different positions with regard to either the ring 10 or the ring 30. The CPU 110 in the common link terminal device 4106 accordingly determines no occurrence of failures at multiple different locations with regard to an identical monitoring ring ID at step S1102 and proceeds to step S116 to control the communication unit 130 to continue transmission of the auxiliary monitor frame 4116.

In the common link terminal devices 4104, 4105, and 4108, the CPUs 110 execute the processing of step S102. As shown in FIGS. 21, 22, and 24, in the state of FIG. 20, with regard to the identical monitoring ring ID '20', the pieces of link failure information R52 and R54 include the common ring IDs '10' and '20' suggesting the occurrence of a failure on the common link shared by the rings 10 and 20, while the pieces of link failure information R55, R56, and R60 include the common ring IDs '20' and '30' suggesting the occurrence of a failure on the common link shared by the rings 20 and 30. Based on detection of the two different locations with regard to the identical monitoring ring ID '20', it is determined that the ring 20 is in a multi-failure state having failures at two different positions. The CPUs 110 in the common link terminal devices 4104, 4105, and 4108 accordingly determine the occurrence of failures at multiple different locations with regard to an identical monitoring ring ID at step S102 and proceed to step S104.

In the state of FIG. 20, the auxiliary monitor frames 4113 and 4114 sent by the common link terminal devices 4104 and 4105 include the ID '20' representing the ring 20 as the ID information, while the pieces of link failure information R52, R54, and R56 shown in FIGS. 21 and 22 include the monitoring ring ID '20'. The auxiliary monitor frame 4117 sent by the common link terminal device 4108 includes the ID '30' representing the ring 30 as the ID information, while the pieces of link failure information R57 and R58 shown in FIG. 24 include the monitoring ring ID '30'. The CPUs 110 in the common link terminals 4104, 4105, and 4108 accordingly determine that any of the monitoring ring IDs is identical with the ID represented by the ID information included in the auxiliary monitor frames at step S104 and proceed to step S106.

In the state of FIG. 20, the pieces of link failure information R51 to R54 include the common ring IDs '10' and '20' and the pieces of link failure information R55 to R58 include the common ring IDs '20' and '30' as shown in FIGS. 21 and 22. There is a number greater than the ID '20' represented by the ID information included in the auxiliary monitor frames 4113 and 4114. The CPUs 110 in the common link terminals 4104 and 4105 accordingly determine that there is a ring in failure having an ID greater in number than the ID represented by the ID information in the auxiliary monitor frames 4113 and 4114 at step S106 and proceed to step S110.

In the state of FIG. 20, the common link terminal devices 4104 and 4105 send the auxiliary monitor frame 4113 or 4114 to only one ring 20. The CPUs 110 in the common link terminal devices 4104 and 4105 accordingly identify no transmission of multiple auxiliary monitor frames at step S110 and proceed to step S114. The CPUs 110 in the common link terminal devices 4104 and 4105 control the communication unit 130 to stop the transmission of the auxiliary monitor frames 4113 and 4114 at step S114. The common link terminal devices 4104 and 4105 accordingly stop the transmission of the auxiliary monitor frames 4113 and 4114.

In the state of FIG. 20, the pieces of link failure information R52 and R54 include the common ring IDs '10' and '20' and the pieces of link failure information R56 to 58 and R60 include the common ring IDs '20' and '30' as shown in FIG. 24. There is no ID having a greater number than the ID '30' represented by the ID information included in the auxiliary monitor frame 4117. The CPU 110 in the common link terminal device 4108 accordingly determines that there is no ring in failure having an ID greater in number than the ID represented by the ID information in the auxiliary monitor frame 4117 at step S106 and proceeds to step S108.

In the state of FIG. 20, no null data is given as the common ring IDs in any of the pieces of link failure information R52, R54, R56 to R58, and R60 as shown in FIG. 24. The CPU 110 in the common link terminal device 4108 accordingly detects no occurrence of a failure on any link other than the common link at step S108 and proceeds to step S116. The CPU 110 in the common link terminal device 4108 controls the communication unit 130 to continue transmission of the auxiliary monitor frame 4117 at step S116.

In response to non-reception of the monitor frame 4111 sent by itself for a preset time period, the monitor device 4101 in the ring 10 recognizes the occurrence of a failure on the ring 10, cancels the blocking of a specific port 4121, and sends an FDB flush frame 4142.

In response to non-reception of the auxiliary monitor frames from the common link terminal devices 4104 and 4105, the auxiliary monitor device 4107 in the ring 20 recognizes the occurrence of a failure on the ring 20, cancels the blocking of a specific port 4122, and sends an FDB flush frame 4143.

The respective devices included in the ring 10 receive the FDB flush frame 4142, delete the FDBs stored therein, and urge the communication network to change the communication route. The respective devices included in the ring 20 receive the FDB flush frame 4143, delete the FDBs stored therein, and urge the communication network to change the communication route.

Even in the occurrence of the failures 4131 and 4132, the respective devices included in the ring 30 enable continuous communication without any specified operations.

As described above, in the communication network of the fourth embodiment having a large ring covering over multiple rings, in the multiple-failure state with the failures 4131 and 4132 on plural common links, the common link terminal devices 4104 and 4105 are controlled to stop transmission of the auxiliary monitor frames 4113 and 4114 to the ring 20 of the smaller ID number. In response to non-reception of the monitor frame 4112 for a preset time period and non-reception of the auxiliary monitor frames 4113 and 4114, the auxiliary monitor device 4107 in the ring 20 cancels the blocking of the specific port 4122. Cancellation of the blocking of the specific port 4122 in this manner enables continuous communication without increasing the number of relay devices as passing points of a monitor frame. This arrangement exerts the similar effects to those of the first through the third embodiments described above. The presence of the large ring covering over the multiple rings desirably forms detours in the event of multiple failures.

E. General Flow of Embodiments

As described above, in response to detection of a link failure in a ring, each of the relay devices, the monitor devices, and the common link terminal devices (hereafter referred to as 'each device') sends a failure detection frame to the ring. This transmits link failure information to the common link terminal device. The common link terminal device generates a link failure information management database, performs the multi-failure detection process, and stops transmission of an auxiliary monitor frame in the event of detection of multiple failures.

In the event of a link failure, the failure detection frame is sent by each device and is thus to be sent to and received from a blocked port in the monitor device. In order to avoid the loop, the failure detection frame is to be discarded in each device. When a common port shared by multiple rings has a failure, failure detection frames are sent to all the rings as the monitoring objects.

The failure detection frame includes information on the ring monitoring the port with a failure and information on the rings sharing the common link.

In response to reception of the failure detection frame, the common link terminal device refers to the own link failure information management database, performs the multi-failure detection process, and stops transmission of the auxiliary monitor frame in the event of detection of multiple failures. The common link terminal device also performs this series of operations in the event of a link failure in the common link terminal device.

In response to non-reception of a monitor frame sent by itself for a preset time period and non-reception of the auxiliary monitor frame from the common link terminal device, the auxiliary monitor device cancels the blocking of its own specific port. The blocking of the port is not cancelled as long as the auxiliary monitor device receives the monitor frame sent by itself. After cancellation of the blocking, the auxiliary monitor frame sends a control frame (FDB flush frame) for clearing the information table (FDB) stored in each device of the ring for controlling the forwarding destinations. In response to reception of the FDB flush frame, the common link terminal device sends an FDB flush frame to the ring with the multiple failures.

In the case of recovery of a link from a failure, each device blocks the recovered link and prohibits transmission of user frames until reception of an FDB flush frame or the user's blocking cancellation operation.

In response to reception of the FDB flush frame, the common link terminal device refers to the own link failure information management database and deletes information on the failed link. The common link terminal device then performs the multi-failure detection process and resumes transmission of the auxiliary monitor frame upon determination of recovery from multiple failures.

In response to reception of the auxiliary monitor frame from the common link terminal device or reception of the monitor frame sent by itself, the auxiliary monitor device blocks one of ring connection ports. After the blocking, the auxiliary monitor device sends a control frame (FDB flush frame) for clearing the FDB.

In the embodiments described above, the system detects the occurrence of multiple failures based on accumulation and analyses of information reported by failure detection frames and stop transmission of auxiliary monitor frames in the event of detection of multiple failures. This arrangement releases the blocked port and enables continuous communication without increasing the number of relay devices as passing points of a monitor frame. The system effectively allows continuous communication even in the event of multiple failures in a communication network of a multi-ring structure.

The embodiments discussed above are to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

What is claimed is:

1. A counter multi-failure system of dealing with multiple link failures occurring in a communication network including a first ring and a second ring connected to the first ring by sharing part of a link in the first ring as a common link, the counter multi-failure system comprising:
  a common link terminal device located at a terminal end of the common link and configured to send an auxiliary monitor frame to the second ring; and
  a monitor device located on the second ring and configured to receive a monitor frame sent by the monitor device and circled through the second ring, as well as the auxiliary monitor frame, and block at least one specific port among ports connecting with the second ring, the common link terminal device having:
  a communication unit configured to send the auxiliary monitor frame, and to receive a failure detection frame sent from a device located on a ring responsive to occurrence of a link failure in the ring;
  a storage unit configured to store link failure information included in the failure detection frame, where the link failure information includes: an address allocated to the device sending the failure detection frame; a monitoring ring identification (ID) allocated to the failure ring connecting with the port detecting the occurrence of the link failure; and common ring IDs allocated to rings sharing the common link of the failure ring; and a controller configured to control the communication unit to stop transmission of at least one auxiliary monitor frame in the event of multiple failures including a failure on the common link, and to identify occurrence of the multiple failures based on the stored link failure information when an identical monitoring ring ID is detected in each of devices with different addresses, and any of the monitoring ring IDs is identical with the ID represented by the ID information included in the auxiliary monitor frame sent by the common link terminal device, and when any of the common ring IDs has a greater number than the ID represented by the ID information included in the auxiliary monitor frame sent by the common link terminal device or when it is determined that a failure occurs on a link other than the common link with regard to the identical monitoring ring ID;

wherein the monitor device maintains the blocking of the specific port in the case of reception of one of the monitor frame and auxiliary monitor frame, and non-reception of the other, and cancels the blocking of the specific port in the case of non-reception of the monitor frame for a preset time period and non-reception of the auxiliary monitor frame.

2. A counter multi-failure system of dealing with multiple link failures occurring in a communication network including a first ring and a second ring connected to the first ring by sharing part of a link in the first ring as a common link, the counter multi-failure system comprising:

a common link terminal device located at a terminal end of the common link and configured to send an auxiliary monitor frame to the second ring; and a monitor device located on the second ring and configured to receive a monitor frame sent by the monitor device and circled through the second ring, as well as the auxiliary monitor frame, and to block at least one specific port among ports connecting with the second ring, the common link terminal device having:

a communication unit configured to send the auxiliary monitor frame, and to receive a failure detection frame sent from a device located on a ring responsive to occurrence of a link failure in the ring;

a storage unit configured to store link failure information included in the failure detection frame, where the link failure information includes: an address allocated to the device sending the failure detection frame; a monitoring ring identification (ID) allocated to the failure ring connecting with the port detecting the occurrence of the link failure; and common ring IDs allocated to rings sharing the common link of the failure ring; and a controller configured to identify occurrence or non-occurrence of multiple failures including a failure on the common link based on the stored link failure information and, upon identification of the occurrence of multiple failures, to control the communication unit to stop transmission of the auxiliary monitor frame, wherein the monitor device maintains the blocking of the specific port in the case of reception of one of the monitor frame and auxiliary monitor frame, and non-reception of the other, and cancels the blocking of the specific port in the case of non-reception of the monitor frame for a preset time period and non-reception of the auxiliary monitor frame;

wherein upon dissatisfaction of a predetermined condition based on the link failure information, the controller of the common link terminal device controls the communication unit to continue transmission of the auxiliary monitor frame even in the event of detection of the multiple failures, when none of the common ring IDs have a greater number than the ID represented by the ID information included in the auxiliary monitor frame sent by the common link terminal device, and when no failure occurs on a link other than the common link with regard to the identical monitoring ring ID.

3. In a communication network including a first ring and a second ring connected to the first ring by sharing part of a link in the first ring as a common link, a common link terminal device located at a terminal end of the common link, the common link terminal device comprising:

a communication unit configured to send an auxiliary monitor frame to a monitor device located on the second ring, and to receive a failure detection frame sent from a device located on a ring responsive to occurrence of a link failure in the ring, where a monitor frame is sent by the monitor device and circled through the second ring;

a storage unit configured to store link failure information included in the failure detection frame, where the link failure information includes: an address allocated to the device sending the failure detection frame; a monitoring ring identification (ID) allocated to the failure ring connecting with the port detecting the occurrence of the link failure; and common ring IDs allocated to rings sharing the common link of the failure ring; and a controller configured to control the communication unit to stop transmission of at least one auxiliary monitor frame in the event of multiple failures including a failure on the common link, and to identify occurrence of the multiple failures based on the stored link failure information when an identical monitoring ring ID is detected in each of devices with different addresses, and any of the monitoring ring IDs is identical with the ID represented by the ID information included in the auxiliary monitor frame sent by the common link terminal device, and when any of the common ring IDs has a greater number than the ID represented by the ID information included in the auxiliary monitor frame sent by the common link terminal device or when it is determined that a failure occurs on a link other than the common link with regard to the identical monitoring ring ID;

wherein the controller maintains blocking of a specific port of the common link terminal device in the case of the monitor device reception of one of the monitor frame and auxiliary monitor frame, and non-reception of the other, and cancels the blocking of the specific port in the case of non-reception of the monitor frame for a preset time period and non-reception of the auxiliary monitor frame.

* * * * *